United States Patent
Mulder et al.

(10) Patent No.: US 9,387,878 B2
(45) Date of Patent: Jul. 12, 2016

(54) SYSTEM PROVIDED WITH AN ASSISTANCE-CONTROLLER FOR ASSISTING AN OPERATOR OF THE SYSTEM, CONTROL-OPERATION ASSISTING DEVICE, CONTROL-OPERATION ASSISTING METHOD, DRIVING-OPERATION ASSISTING DEVICE, AND DRIVING-OPERATION ASSISTING METHOD

(71) Applicants: NISSAN MOTOR CO., LTD., Yokohama-shi, Kanagawa (JP); DELFT UNIVERSITY OF TECHNOLOGY, Delft (NL); ENTROPY CONTROL, INC., La Jolla, CA (US)

(72) Inventors: Mark Mulder, Den Hague (NL); David Abbink, Amsterdam (NL); Rene Van Paassen, Delft (NL); Max Mulder, Pijnacker (NL); Frans Van Der Helm, Rijswijk (NL); Erwin R. Boer, La Jolla, CA (US); Yuji Takada, Zama (JP)

(73) Assignees: NISSAN MOTOR CO., LTD., Yokohama-shi (JP); DELFT UNIVERSITY OF TECHNOLOTY, Delft (NL); ENTROPY CONTROL, INC., La Jolla, CA (US)

(*) Notice: Subject to any disclaimer, the term of this patent is extended or adjusted under 35 U.S.C. 154(b) by 138 days.

(21) Appl. No.: 13/965,919

(22) Filed: Aug. 13, 2013

(65) Prior Publication Data
US 2014/0046503 A1 Feb. 13, 2014

Related U.S. Application Data

(62) Division of application No. 13/121,469, filed as application No. PCT/JP2008/068135 on Sep. 30, 2008, now Pat. No. 8,521,367.

(51) Int. Cl.
*G05D 1/02* (2006.01)
*B62D 6/00* (2006.01)
(Continued)

(52) U.S. Cl.
CPC .............. *B62D 6/00* (2013.01); *B60W 30/12* (2013.01); *B60W 40/02* (2013.01); *B60W 40/072* (2013.01); *B62D 6/002* (2013.01); *B62D 15/025* (2013.01); *G05D 1/0212* (2013.01)

(58) Field of Classification Search
None
See application file for complete search history.

(56) References Cited

U.S. PATENT DOCUMENTS

| 5,337,846 A | 8/1994 | Ogaki et al. |
| 5,554,969 A | 9/1996 | Eguchi |

(Continued)

FOREIGN PATENT DOCUMENTS

| DE | 10 2006 033 458 A1 | 1/2007 |
| DE | 102006033458 A1 * | 1/2007 |

(Continued)

OTHER PUBLICATIONS

International Search Report dated Oct. 5, 2009 from WO 2010/038317 (PCT/JP2008/068135), 5 pages.

(Continued)

*Primary Examiner* — Shelley A Chen
(74) *Attorney, Agent, or Firm* — Foley & Lardner LLP

(57) ABSTRACT

A target-travel-path generating circuit calculates a target travel path along which a controlled object can travel in the future from a current controlled object position. An ideal-control-signal calculating circuit calculates a control profile to travel along the target travel path, and a difference calculating circuit calculates a difference between an ideal control magnitude and a current control magnitude. A controller controls an operation system based on a magnitude of the difference to assist a control operation and a control-operation-state of an operator, an environment-state, and a required operation-precision. The operator receives assistance corresponding to the magnitude of the difference from an ideal control state, the control-operation-state, the environment-state, and the required operation-precision. An outputted control-operation assistance control is suitable for conditions that characterize the operator state, the environment, and the controlled object.

6 Claims, 19 Drawing Sheets

(51) Int. Cl.
   *B60W 30/12*   (2006.01)
   *B60W 40/02*   (2006.01)
   *B62D 15/02*   (2006.01)
   *B60W 40/072*  (2012.01)

(56) References Cited

U.S. PATENT DOCUMENTS

| | | |
|---|---|---|
| 5,854,987 A | 12/1998 | Sekine et al. |
| 5,878,361 A | 3/1999 | Sekine et al. |
| 5,878,362 A | 3/1999 | Sekine et al. |
| 5,883,585 A | 3/1999 | Akutsu et al. |
| 5,928,299 A | 7/1999 | Sekine et al. |
| 6,013,994 A | 1/2000 | Endo et al. |
| 7,540,351 B2 | 6/2009 | Kataoka et al. |
| 8,209,052 B2 | 6/2012 | Lauria et al. |
| 2002/0015439 A1 | 2/2002 | Kohli et al. |
| 2003/0120404 A1 | 6/2003 | Endo |
| 2003/0136604 A1 | 7/2003 | Yamanaka et al. |
| 2006/0287824 A1 | 12/2006 | Lin |
| 2007/0017735 A1* | 1/2007 | Kataoka et al. ............... 180/446 |
| 2007/0219691 A1 | 9/2007 | Fukuba et al. |
| 2008/0066295 A1 | 3/2008 | Shimizu et al. |
| 2008/0129475 A1 | 6/2008 | Breed et al. |
| 2008/0257635 A1 | 10/2008 | Shimizu et al. |

FOREIGN PATENT DOCUMENTS

| | | | |
|---|---|---|---|
| EP | 1 889 775 A2 | | 2/2008 |
| EP | 2 019 382 A1 | | 1/2009 |
| JP | 08-263794 A | | 10/1996 |
| JP | 09-156528 A | | 6/1997 |
| JP | 2000-082198 A | | 3/2000 |
| JP | 2007-182198 A | | 7/2007 |
| JP | 2007182198 A | * | 7/2007 |
| JP | 2007-305079 A | | 11/2007 |

OTHER PUBLICATIONS

International Preliminary Report on Patentability dated Apr. 5, 2011 from WO 2010/038317 (PCT/JP2008/068135), 14 pages.

Japanese Office Action and English language translation dated Oct. 23, 2012 from JP 5433007 (PCT/JP2011-528501), 6 pages.

Japanese Office Action and English language translation dated May 21, 2013 from JP 5433007 (PCT/JP2011/528501), 3 pages.

European Search Report dated Nov. 20, 2012 from EP 2537735 (EP 1206641.0), 9 pages.

European Communication dated Jan. 26, 2012 from EP 2342113 (EP 08811421.0), 4 pages.

* cited by examiner

FIG. 17
(a)
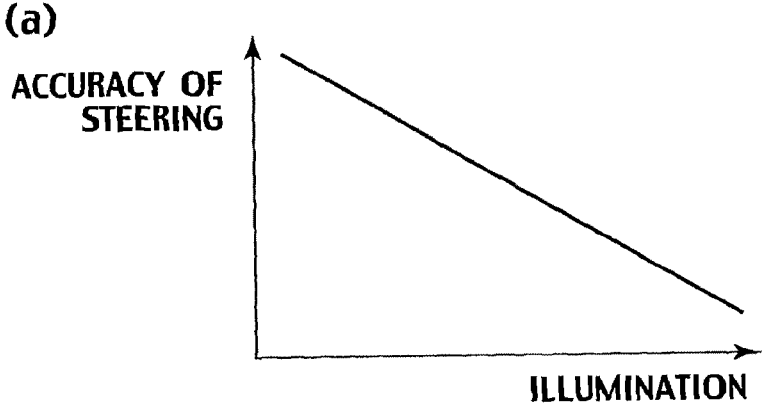
(b)
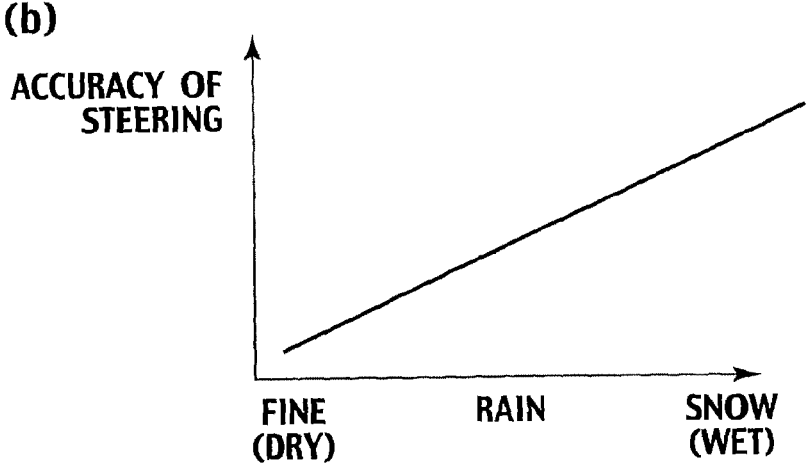
(c)
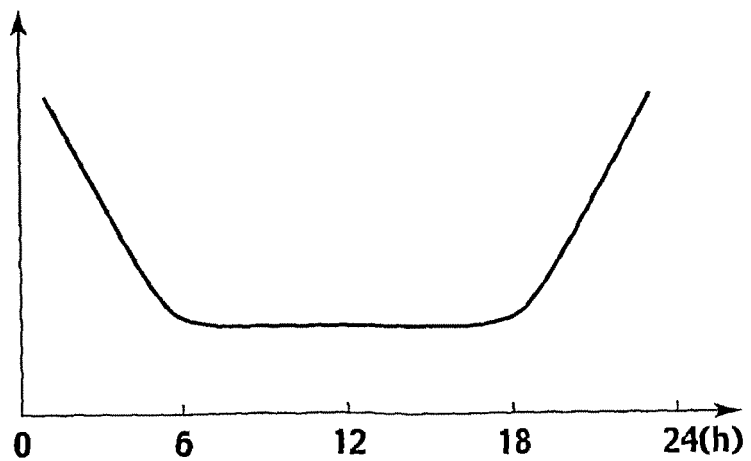

SYSTEM PROVIDED WITH AN ASSISTANCE-CONTROLLER FOR ASSISTING AN OPERATOR OF THE SYSTEM, CONTROL-OPERATION ASSISTING DEVICE, CONTROL-OPERATION ASSISTING METHOD, DRIVING-OPERATION ASSISTING DEVICE, AND DRIVING-OPERATION ASSISTING METHOD

CROSS-REFERENCE TO RELATED APPLICATIONS

This application is a divisional of Ser. No. 13/121,469 filed on Jun. 9, 2011, which is a national stage application of International Application No. PCT/JP2008/068135 filed on Sep. 30, 2008, the entire contents of all are incorporated herein by reference.

FIELD OF ART

The present invention relates to a control-operation assisting device that assists a control operation of an operator for an controlled object and a control-operation assisting method.

BACKGROUND ART

Conventionally, as disclosed in Japanese Patent Application Laid-open No. H9-156528, there has been known a vehicle-operation assisting device that detects an advancing-direction azimuth angle of a vehicle and a tangential-direction azimuth angle of a road on which the vehicle travels and generates a steering torque in an orientation toward which a deviation between the detected advancing-direction azimuth angle and tangential-direction azimuth angle is decreased, thereby generating a steering force in a direction in which the vehicle is not departed from the road.

The conventional vehicle-operation assisting device is configured to output steering control based only on a deviation between the advancing-direction azimuth angle and the tangential-direction azimuth angle at a control point, without regard to a state of the vehicle operation of a driver and an environment on a periphery of the vehicle. Thus, according to the conventional vehicle-operation assisting device, steering control not suitable for the state of the vehicle operation of a driver (driving intension) and the environment on a periphery of the vehicle is outputted. This sometimes makes a driver feel a sense of discomfort or inconvenience for the steering control.

DISCLOSURE OF INVENTION

According to the first aspect of the present invention, a system provided with an assistance-controller for assisting an operator of the system, comprises: a system-state detecting unit that detects information about an operational state of the system; an ideal-state generating unit that generates an ideal state of the system depending on at least the system-state detected by the system-state detecting unit; an ideal-input calculating unit that calculates an ideal input for the system so as to operate along the ideal state generated by the ideal-state generating unit; a system-input interface for converting an operator-control action into a control signal for the system; a difference calculating unit that calculates a difference between the ideal input calculated by the ideal-input calculating unit and the actual control-signal that the system-input interface provides to the system; wherein the system-input interface comprises the assistance-controller, and the assistance-controller determines at least one conversion-parameter pertaining to the conversion of the operator control-action into the control signal for the system depending on the difference calculated by the difference calculating unit so as to assist the operator in the operation of the system.

According to the second aspect of the present invention, a control-operation assisting device that assists control operation of an operator on the manipulator for control of a controlled object, comprises: a controlled-object-state detection unit that detects information about the state of the controlled object; a manipulator-state detection unit that detects information about the state of manipulator; an environment-state detection unit that detects information about the state of control operation environment on the periphery of the controlled object; an ideal-interaction generating unit that generates the ideal interaction dynamics between the controlled object and the environment from the information about the state of the controlled object detected by the controlled-object-state detection unit and the environmental state detected by the environment-state detection unit; an ideal-manipulator-impedance generation unit that generates an ideal impedance for the manipulator from the ideal interaction dynamics between controlled object and the environment generated by the ideal-interaction generating unit; a manipulator-impedance-controller assistance system that controls the impedance of the manipulator based on the ideal manipulator impedance generated by the ideal-manipulator-impedance generating unit to produce the desired interaction dynamics between the controlled object and the environment; an ideal-manipulator-control-signal generating unit that generates an ideal manipulator control signal from the ideal interaction dynamics between controlled object and the environment generated by the ideal-interaction generating unit; a manipulator-control-signal-difference calculating unit that calculates the difference between the ideal manipulator control signal generated by the ideal-manipulator-control-signal generating unit and the state of the manipulator detected by the manipulator-state detection unit; an operation-precision estimation unit that estimates the precision required for the control operation of the controlled object from the ideal interaction dynamics between the controlled object and the environment generated by the ideal-interaction generating unit; a control-difference-impedance generating unit that generates a control difference impedance from the required precision estimated by the operation-precision estimation unit; an actuator-torque-controller-assistance system that controls the additional torque produced by the actuator based on the magnitude of the difference calculated by the manipulator-control-signal-difference calculating unit and the difference impedance calculated by the control-difference-impedance generating unit to assist the control-operation of the operator on the manipulator to achieve the required operation precision.

According to the third aspect of the present invention, from information about a vehicle operation state and information about a vehicle operation environment, an ideal control path of an operation target object is generated; a control history of an operation system for the operation target object to operate along the generated ideal control path is calculated as an ideal control signal; a difference between the calculated ideal control signal and the information about the vehicle operation state is calculated; the operation system is controlled based on a magnitude of the calculated difference to assist the operation of the operator for the operation system; from the information about the vehicle operation state and/or the information about the vehicle operation environment, an accuracy required for the vehicle operation of the operation target object is estimated; and a control level of the operation system is increased as the estimated accuracy is higher.

A system-state detecting unit of the first aspect of the present invention corresponds to a controlled-object-state detection unit, a manipulator-state detection unit, and environment-state detection unit of the second aspect of the present invention, and a vehicle-operation-state detecting unit and an environment-state detecting unit of the third aspect of the present invention.

An ideal-state generating unit of the first aspect of the present invention corresponds to an ideal-interaction generating unit of the second aspect of the present invention, and an ideal-control-path generating unit of the third aspect of the present invention.

A assistance controller of the first aspect of the present invention corresponds to an actuator-torque-controller-assistance system of the second aspect of the present invention, and an operation-system assistance controller of the third aspect of the present invention.

An ideal-input calculating unit of the first aspect of the present invention corresponds to an ideal-manipulator-impedance generation unit of the second aspect of the present invention, and an ideal-control-signal calculating unit of the third aspect of the present invention.

A system-input interface unit of the first aspect of the present invention corresponds to a manipulator-impedance-controller assistance system and ideal-manipulator-control-signal generating unit of the second aspect of the present invention, and an ideal-control-signal calculating unit of the third aspect of the present invention.

A difference calculating unit of the first aspect of the present invention corresponds to a manipulator-control-signal-difference calculating unit of the second aspect of the present invention, and a difference calculating unit of the third aspect of the present invention.

A operation-precision estimation unit of the second aspect of the present invention corresponds to an operation-system assistance controller of the third aspect of the present invention.

A control-difference-impedance generating unit of the second aspect of the present invention corresponds to an operation-precision estimating unit of the third aspect of the present invention.

BRIEF DESCRIPTION OF THE DRAWINGS

FIGS. 17(a), 17(b), and 17(c) are graphs showing one example of relations between: the accuracy required for the steering operation; and an illumination on a periphery of the vehicle, weather, and a travel time zone of the vehicle, respectively.

BEST MODE FOR CARRYING OUT THE INVENTION

Figure 1:
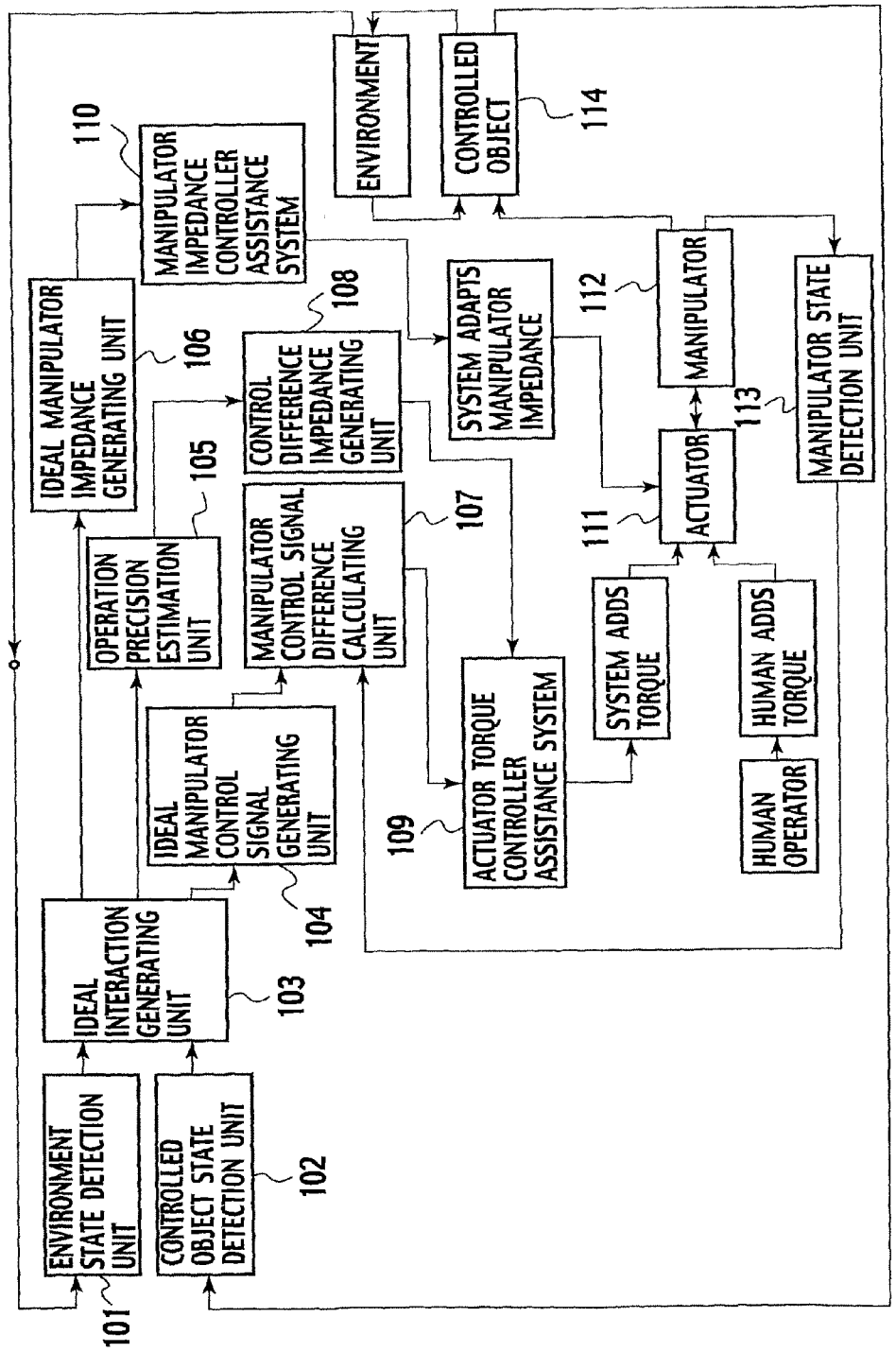
FIG. 1 is a block diagram showing a configuration of a control-operation assisting device according to the present invention.

A control-operation assisting device system according to the present invention assists the control operation of an operator for the control of a controlled object. As shown in FIG. 1 a control-operation assisting device according to the present invention, comprises: an environment state detection unit 101, a controlled object state detection unit 102, an ideal interaction generating unit 103, an ideal manipulator control signal generating unit 104, an operation precision estimation unit 105, an ideal manipulator impedance generating unit 106, a manipulator control signal difference calculating unit 107, a control difference impedance generating unit 108, an actuator torque controller assistance system 109, manipulator impedance controller assistance system 110, an actuator 111, a manipulator 112, and a manipulator state detection unit 113.

The environment state detection unit 101 detects information about the state of control operation environment on the periphery of the controlled object 114. The controlled object state detection unit 102 detects information about the state of the controlled object 114. The ideal interaction generating unit 103 generates the ideal interaction dynamics between the controlled object 114 and the environment from the information about the state of the controlled object 114 detected by the controlled object state detection unit 102 and the environmental state detected by the environment state detection unit 101.

The ideal manipulator control signal generating unit 104 generates an ideal manipulator control signal from the ideal interaction dynamics between controlled object 114 and the environment generated by the ideal-interaction generating unit 103. The operation precision estimation unit 105 estimates the precision required for the control operation of the controlled object 114 from the ideal interaction dynamics between the controlled object 114 and the environment generated by the ideal-interaction generating unit 103.

The ideal manipulator impedance generating unit 106 generates an ideal impedance for the manipulator 112 from the ideal interaction dynamics between controlled object 114 and the environment generated by the ideal-interaction generating unit 103. The manipulator control signal difference calculating unit 107 calculates the difference between the ideal manipulator control signal generated by the ideal-manipulator-control-signal generating unit and the state of the manipulator 112 detected by the manipulator-state detection unit 113.

The control difference impedance generating unit 108 generates a control difference impedance from the required precision estimated by the operation precision estimation unit 105. The actuator torque controller assistance system 109 controls the additional torque produced by the actuator 111 based on the magnitude of the difference calculated by the manipulator control signal difference calculating unit 107 and the difference impedance calculated by the control difference impedance generating unit 108 to assist the control operation of the operator on the manipulator 112 to achieve the required operation precision.

The manipulator impedance controller assistance system 110 controls the impedance of the manipulator 112 based on the ideal manipulator impedance generated by the ideal manipulator impedance generating unit 106 to produce the desired interaction dynamics between the controlled object 114 and the environment.

Configurations of a vehicle-operation assisting device according to first to fifth embodiments of the present invention will be explained below with reference to the drawings. In the following embodiments, for a control object operated by an operator, a vehicle is assumed. However, the present invention is not limited to the embodiments, and can be applied to operation control objects, as a whole, in which a human is involved in control, such as an unmanned vehicle control over a large distance (UAVs in air or space), a tele-operated surgery (over distance or in size), an aviation and flight simulation, a factory worker/dancer/sportsman, an (micro)-assembly (over distance or in size).

When the present invention is applied to the unmanned vehicle control, operator assisting device, operator, controlled object, control input signal, control input profile, Ideal interaction between control object and environment, manipulator actuator, environment, and constraints of interaction between controlled object and environment of the present invention corresponds to tele-operation assisting device, tele-operator, remotely controlled vehicle, manipulator output signal, control input profile, ideal 3D trajectory of remotely controlled vehicle, stick actuator, road conditions (weather conditions, location of static and dynamic objects), and TTC to static or dynamic objects (restricted areas, communication time delays), respectively.

When the present invention is applied to the tele-operated surgery, operator assisting device, operator, controlled object, control input signal, control input profile, Ideal interaction between control object and environment, manipulator actuator, environment, and constraints of interaction between controlled object and environment of the present invention corresponds to surgery assisting device, surgeon, robotic surgical device, manipulator output signal, manipulator output profile, ideal placement and exerted forces of remotely controlled surgical device, haptic glove actuators, location of damageable tissues (properties of fluids in which the gripper moves, location of tissue that needs to be operated on), and TTC to static or dynamic objects (restricted areas, communication time delays), respectively.

When the present invention is applied to the aviation and flight simulation, operator assisting device, operator, controlled object, control input signal, control input profile, Ideal interaction between control object and environment, manipulator actuator, environment, and constraints of interaction between controlled object and environment of the present invention corresponds to aircraft flying assisting device, pilot, aircraft/helicopter, stick signal, stick output profile, ideal 3D trajectory of aircraft, stick actuator, distance to ground and no-go areas (location and orientation of landing zone, distance to other planes), and TTC to static or dynamic objects (restricted areas), respectively.

When the present invention is applied to the a factory worker/dancer/sportsman, operator assisting device, operator, controlled object, control input signal, control input profile, Ideal interaction between control object and environment, manipulator actuator, environment, and constraints of interaction between controlled object and environment of the present invention corresponds to body movement assisting device (haptic suit), factory worker/dancer/sportsman, human body, body movement control signals (pressures on body, limb torques, and position control signals), body movement profile, ideal exerted forces by limbs or ideal limb movement path (each rigid body separately but constraint), haptic suit or body movement support suit (pressure and actuators), location of objects (properties of such objects, muscle activity profiles necessary to perform limb movements well, contact forces with objects that need to be manipulated), and ITC to static or dynamic objects (restricted areas, communication time delays), respectively.

When the present invention is applied to the (micro)-assembly, operator assisting device, operator, controlled object, control input signal, control input profile, Ideal interaction between control object and environment, manipulator actuator, environment, and constraints of interaction between controlled object and environment of the present invention corresponds to assembly assisting device, assembler, remotely controlled gripper, manipulator output signal, manipulator output profile, ideal placement and exerted forces of the remotely controlled gripper, haptic glove actuators (haptic master), location of objects (properties of such objects, contact forces with objects that need to be manipulated), and TTC to static or dynamic objects (restricted areas, communication time delays), respectively.

First Embodiment

First, with reference to FIG. 2 to FIG. 9, the configuration of a vehicle-operation assisting device according to the first embodiment of the present invention is explained.

Configuration of Vehicle-Operation Assisting Device

Figure 2:
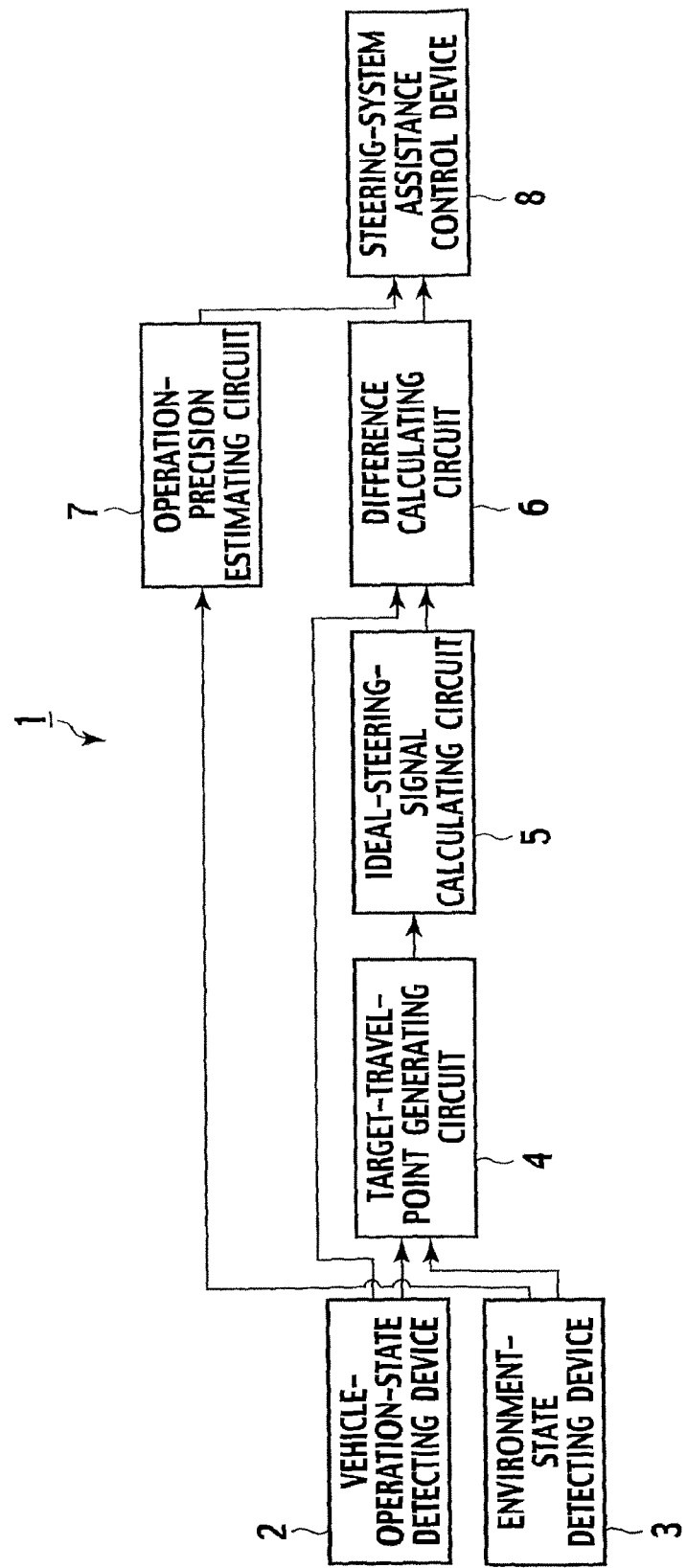
FIG. 2 is a block diagram showing a configuration of a vehicle-operation assisting device according to a first embodiment of the present invention.

A vehicle-operation assisting device 1 according to the first embodiment of the present invention is mounted on a vehicle as the control-object, and includes a vehicle-operation-state detecting device 2, an environment-state detecting device 3, a target-travel-point generating circuit 4, and an ideal-steering-signal calculating circuit 5, a difference calculating circuit 6, an operation-precision estimating circuit 7, and a steering-system assistance control device 8, as main parts, as shown in FIG. 2.

Figure 3:
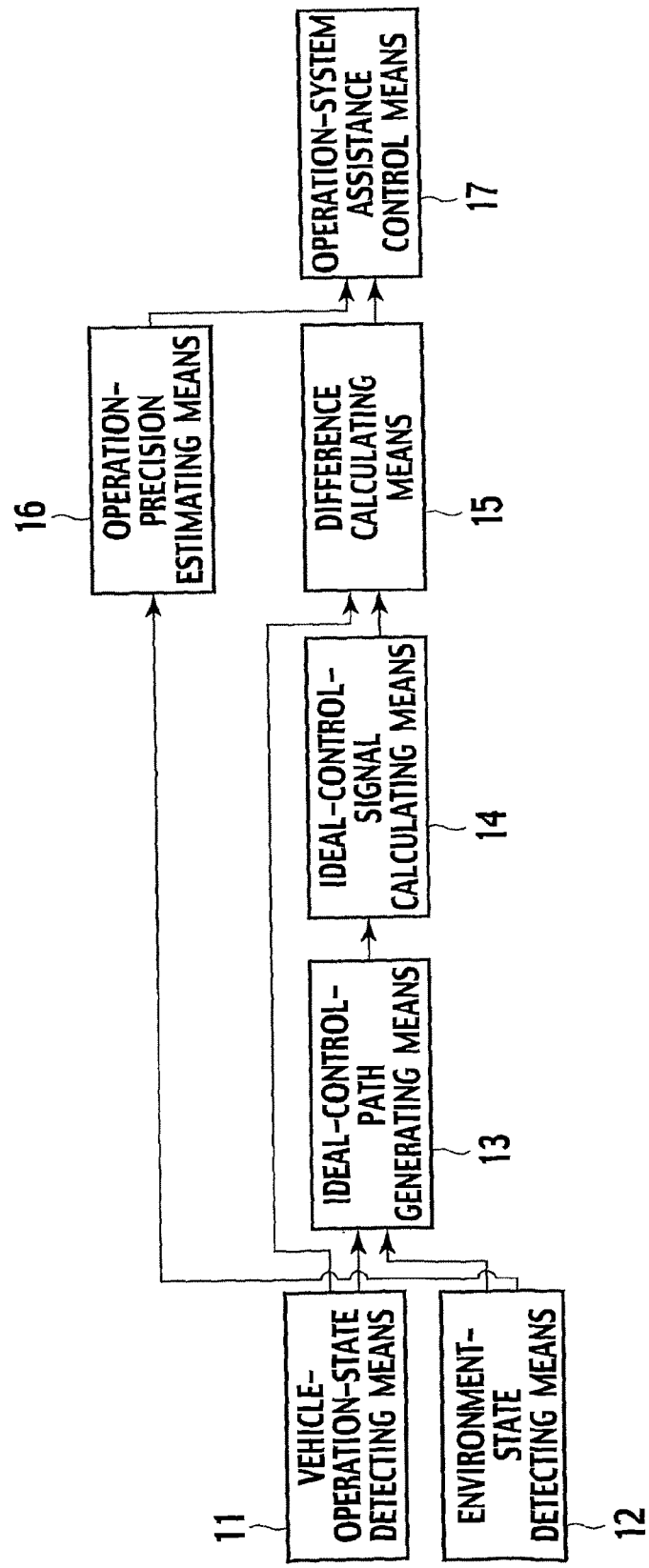
FIG. 3 is a functional block diagram showing the configuration of the vehicle-operation assisting device according to the present invention.

The vehicle-operation-state detecting device 2 corresponds to a vehicle-operation-state detecting means 11 according to the present invention shown in FIG. 3. The vehicle-operation-state detecting device 2 includes various sensors such as a GPS (Global Positioning System), a speed sensor, an earth-magnetism sensor, an acceleration sensor, and a steering-angle sensor, and detects a position of the vehicle, a speed thereof, an advancing direction angle thereof, an acceleration thereof, and a steering angle thereof.

The environment-state detecting device 3 corresponds to an environment-state detecting means 12 according to the present invention shown in FIG. 3. The environment-state detecting device 3 includes an imaging device, a laser radar, an ultrasonic sensor, a navigation device, a roughness sensor, etc., arranged at a front and sides of the vehicle, and detects obstacles present in a periphery of the vehicle; the curvature profile, the lane width, and the roughness of the road on which the vehicle travels; and moving objects adjacent to the vehicle.

The target-travel-point generating circuit 4, the ideal-steering-signal calculating circuit 5, the difference calculating circuit 6, and the operation-precision estimating circuit 7 correspond to an ideal-control-path generating means 13, an ideal-control-signal calculating means 14, a difference calculating means 15, and an operation-precision estimating means 16 according to the present invention shown in FIG. 3, respectively. Functions (operations) of these circuits are realized by a microcomputer mounted on the vehicle executing a control program. The functions of the respective circuits are described later.

The steering-system assistance control device 8 corresponds to an operation-system assistance control unit 17 according to the present invention shown in FIG. 3. The steering-system assistance control device 8 is configured by a known electric power steering mechanism or power-assist mechanism arranged on a steering of the vehicle, and executes control for assisting the steering operation of the driver, which is described in detail later.

The vehicle-operation assisting device 1 having such a configuration executes the vehicle-operation-assistance control process shown below to output vehicle-operation assistance control suitable for the state of vehicle operation by the driver or the environment on the periphery of the vehicle. With reference to the flowchart shown in FIG. 4, the operation of the vehicle-operation assisting device 1 when executing the vehicle-operation assistance control process is explained below.

Vehicle-Operation Assistance Control Process

Figure 4:
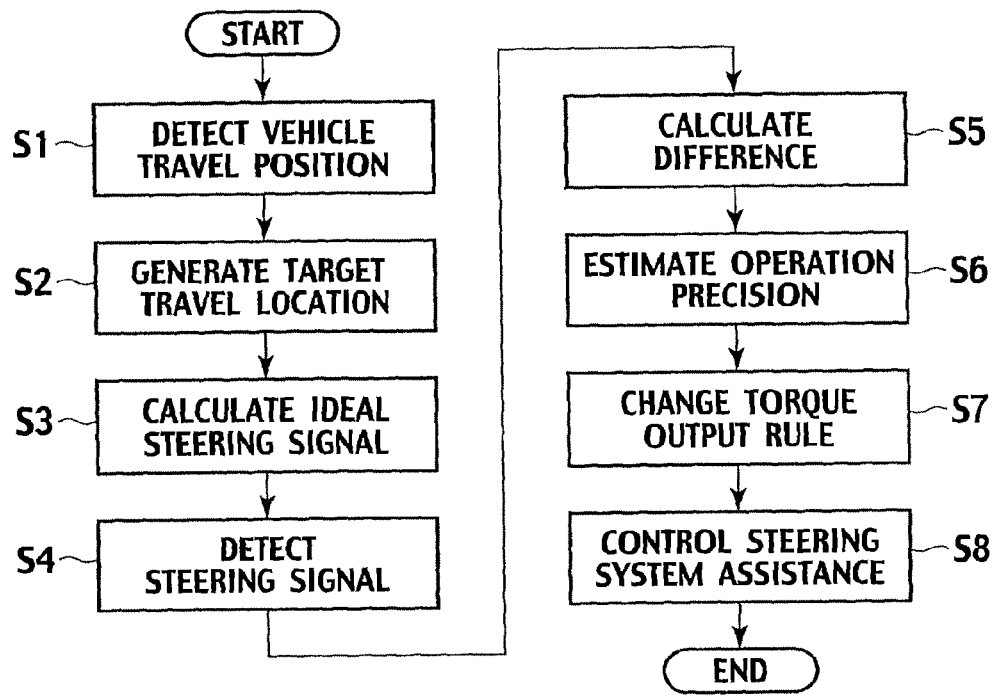
FIG. 4 is a flowchart showing a flow of a vehicle-operation assistance control process according to the first embodiment of the present invention.
Figure 5:
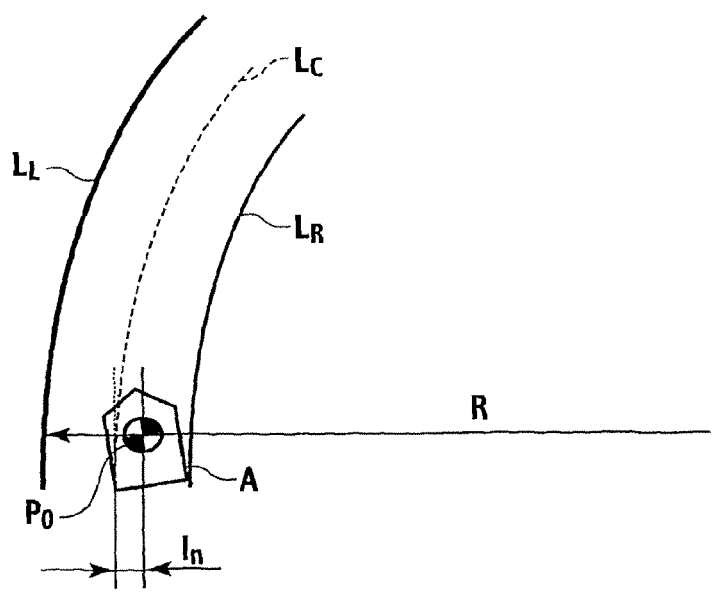
FIG. 5 is an explanatory diagram of a process for detecting a vehicle position and orientation in the environment at step S1 shown in FIG. 4.

The flowchart shown in FIG. 4 is started when the ignition switch of the vehicle is switched from an off state to an on state, and the vehicle-operation assistance control process proceeds to the process at step S1. The vehicle-operation assistance control process is executed repeatedly for each predetermined control cycle.

In the process at step S1, the environment-state detecting device 3 detects a position of the vehicle within a traffic lane on which the vehicle is traveling. More specifically, the environment-state detecting device 3 extracts an edge image from a video in vehicle lateral directions photographed by the imaging device arranged on lateral sides of the vehicle to extract left and right lane markers $L_L$ and $L_R$ (see FIG. 5) of the traffic lane of the vehicle. The environment-state detecting device 3 calculates a center line $L_C$ (see FIG. 5) of the traffic lane from the extracted left and right lane markers $L_L$ and $L_R$ to calculate a horizontal direction distance $l_n$ (see FIG. 5) between the calculated center line $L_C$ and a traveling position $P_0$ of a vehicle A. Thereby, the process at step S1 is completed, and the vehicle-operation assistance control process proceeds to a process at step S2.

In the process at step S2, the target-travel-point generating circuit 4 calculates from a current vehicle position a target travel location at which the vehicle should pass through in the future. More specifically, the target-travel-point generating circuit 4 obtains a video in a vehicle front direction via the environment-state detecting device 3, and extracts the edge image from the obtained video to detect a linear shape (curvature R) of the center line $L_C$ of the traffic lane. The target-travel-point generating circuit 4 then sets the target travel location based on information about the detected linear shape. In the present embodiment, the target-travel-point generating circuit 4 changes a setting method of the target travel location between when the vehicle travels on a straight route and when the vehicle travels on a curved route.

Figure 6:
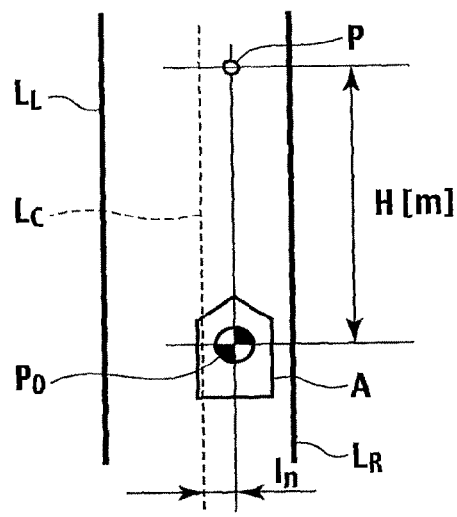
FIG. 6 is an explanatory diagram of a generation process of a target travel location when the vehicle travels on a straight route at step S2 shown in FIG. 4.
Figure 7:
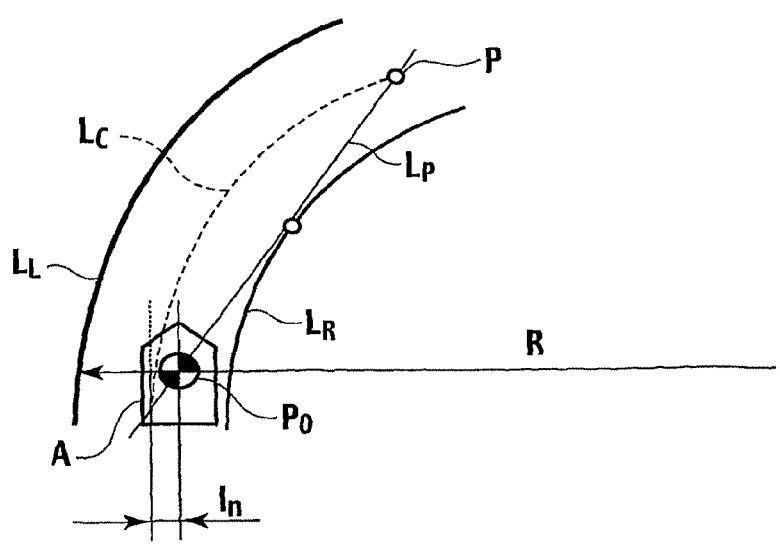
FIG. 7 is an explanatory diagram of a generation process of a target travel location when the vehicle travels on a curved route at step S2 shown in FIG. 4.

That is, when the vehicle travels on the straight route, the target-travel-point generating circuit 4 sets a position H[m] ahead of the current position $P_0$ of the vehicle A to a target travel location P, as shown in FIG. 6. On the other hand, when the vehicle travels on the curved route, as shown in FIG. 7, the target-travel-point generating circuit 4 calculates a tangential line $L_P$ for a lane borderline such as a lane marker on an inner side of the curved route passing at the current position $P_0$ of the vehicle A (in an example shown in FIG. 7, the right lane marker $L_R$), etc., and sets to the target travel location P, a point at which the calculated tangential line $L_P$ crosses the center line $L_C$ of the traffic lane. Thereby, the process at step S2 is completed, and the vehicle-operation assistance control process proceeds to a process at step S3.

In the process at step S3, the ideal-steering-signal calculating circuit 5 calculates an ideal steering angle $\hat{S}$ to reach the target travel location P calculated by the process at step S2. More specifically, the ideal-steering-signal calculating circuit 5 inputs the information detected by the vehicle-operation-state detecting device 2 and the environment-state detecting device 3, into a driver model in which a value of the ideal steering angle $\hat{S}$ is $2 \cdot G \cdot \upsilon \cdot (v/L)$ ($v$ denotes a vehicle speed, and G denotes a steering gain of the vehicle), where $\upsilon$ denotes an angle formed by a vector connecting the current vehicle position $P_0$ and the target travel location P, and the vehicle advancing direction thereby to calculate the ideal steering angle $\hat{S}$ to reach the target travel location P calculated by the process at step S2. Thereby, the process at step S3 is completed, and the vehicle-operation assistance control process proceeds to a process at step S4.

In the process at step S4, the vehicle-operation-state detecting device 2 detects a current vehicle steering angle S. Thereby, the process at step S4 is completed, and the vehicle-operation assistance control process proceeds to a process at step S5.

In the process at step S5, the difference calculating circuit 6 calculates a difference δ (=Ŝ−S) between the ideal steering angle Ŝ calculated by the process at step S3 and the current vehicle steering angle S detected by the process at step S4. Thereby, the process at step S5 is completed, and the vehicle-operation assistance control process proceeds to a process at step S6.

Figure 8:
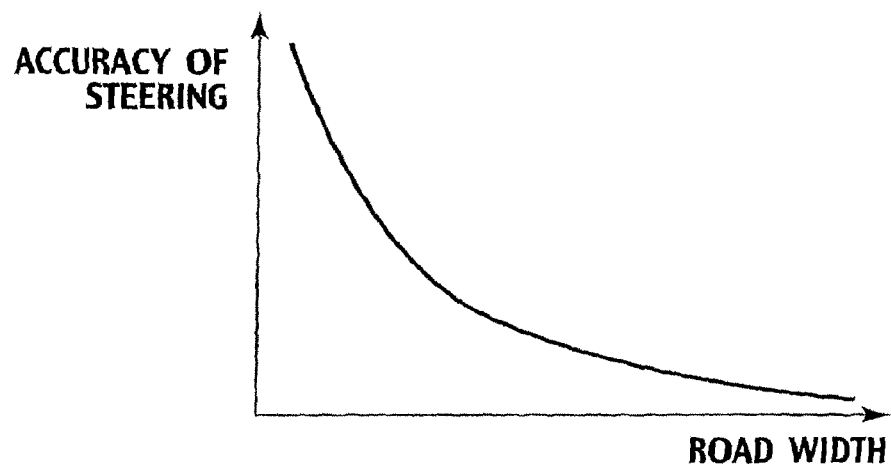
FIG. 8 is a graph showing one example of a relation between the road-width of the road on which the vehicle travels and the accuracy required for the steering operation.
Figure 9:
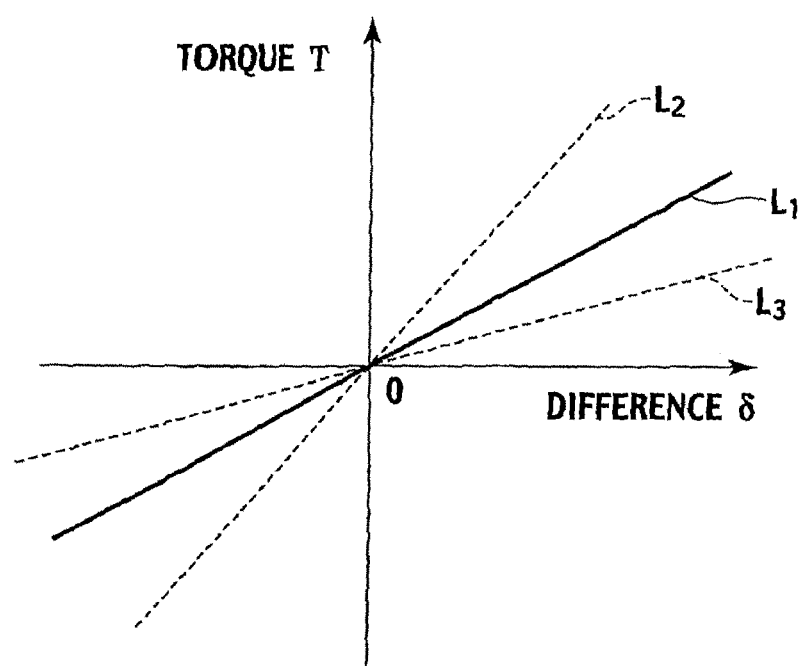
FIG. 9 is a graph showing one example of a torque output rule used for the process at step S8 shown in FIG. 4.

In the process at step S6, the operation-precision estimating circuit 7 estimates an accuracy "a" of the steering operation required in a state of the driving environment on a periphery of the vehicle, detected by the environment-state detecting device 3. Generally, in traveling scenes such as when a road width of a traffic route is narrow, when the traffic route is crowded, when the vehicle enters a curved route, and when the surface roughness of the traffic route is low, the accuracy is required for the steering operation. On the other hand, in traveling scenes, such as when the vehicle is traveling on a long straight route or on an express way, the accuracy required for the steering operation is low. Accordingly, in the present embodiment, the operation-precision estimating circuit 7 previously holds a map showing a corresponding relationship between the traveling scene and the steering accuracy and references the map to estimate the required accuracy of the steering operation. More specifically, the operation-precision estimating circuit 7 previously holds a map, shown in FIG. 8, showing a corresponding relationship between a road width of the road on which the vehicle travels and the required accuracy of the steering operation, and reads from the map the accuracy of the steering operation corresponding to the road width of the traffic route detected by the environment-state detecting device 3 to estimate the required accuracy of the steering operation. Thereby, the process at step S6 is completed, and the vehicle-operation assistance control process proceeds to a process at step S7.

In the process at step S7, the steering-system assistance control device 8 changes a torque output rule used for a process at step S8 described later, based on: the horizontal direction distance $l_n$ between the center line $L_C$ of the traffic lane of the vehicle and the traveling position of the vehicle A, detected by the process at step S1; the difference δ between the ideal steering angle Ŝ calculated by the process at step S5 and the current vehicle steering angle S; and the steering accuracy "a" estimated by the process at step S6. In the present embodiment, the torque output rule is that in a power-assist mechanism for generating a torque of which the magnitude is proportional to that of the difference δ between the ideal steering angle Ŝ and the current vehicle steering angle S, as indicated by a solid line $L_1$ in FIG. 9, and a torque T can be expressed by T=K×δ where K denotes a constant of proportion.

The constant of proportion K is a function between the horizontal direction distance $l_n$ and the steering operation accuracy "a", and is represented by an equation of: K=F($l_n$, a)=|$l_n$|×a×$K_0$, for example. That is, the generated torque is changed according to a magnitude of the horizontal direction distance $l_n$ and the steering accuracy "a". More specifically, the proportional constant K increases as the horizontal direction distance $l_n$ and the steering accuracy "a" increase, and the torque output rule is changed as shown by a dotted line L2 in FIG. 9. On the other hand, the constant of proportion K decreases as the horizontal direction distance $l_n$ and the steering operation accuracy "a" decrease, and the torque output rule is changed as indicated by a dotted line L3 in FIG. 9. Thereby, the process at step S7 is completed, and the vehicle-operation assistance control process proceeds to a process at step S8.

In the process at step S8, the steering-system assistance control device 8 implements control for generating the steering torque to a steering wheel. In the first embodiment, the steering-system assistance control device 8 has an electric motor as a mechanism for generating a steering force, and implements motor control according to the torque output rule set in the process at step S7. As a result, the driver feels the steering torque superposed on the steering wheel via the steering wheel. In the present embodiment, a repulsive force for the steering operation by the driver, written as the torque output rule, is controlled. In contrary, an induction force for a non-operation by the driver can be controlled. Thereby, the process at step S8 is completed, and a series of vehicle-operation assistance control processes are ended.

As is obvious from the explanations, according to the vehicle-operation assisting device 1 of the first embodiment of the present invention, the target-travel-point generating circuit 4 calculates the target travel location at which the vehicle should pass in the future from the current vehicle position, the ideal-steering-signal calculating circuit 5 calculates the ideal steering angle Ŝ to reach the target travel location P, and the difference calculating circuit 6 calculates the difference δ between the ideal steering angle Ŝ and the current vehicle steering angle S. The steering-system assistance control device 8 controls a steering system based on the magnitude of the calculated difference δ to assist the vehicle operation of the driver. According to such a configuration, it is possible to provide the driver with steering operation assistance according to the magnitude of the difference δ from an ideal driving state, and thus, the vehicle-operation assistance control suitable for the state of the vehicle operation of the vehicle by the driver and the environment on a periphery of the vehicle can be outputted.

In the conventional vehicle-operation assisting device, an assistance control amount is amplified to recover a delay in time from the vehicle operation assistance is provided to the driver until the driver takes a control action, and as a result, a divergent system is sometimes generated. However, according to the driving assisting device 1 of the first embodiment of the present invention, as described above, the steering-system assistance control device 8 controls the steering system based on the magnitude of the difference δ between the ideal steering angle Ŝ and the current vehicle steering angle S, and thus, unlike in the conventional vehicle-operation assisting device, the present invention can inhibit the generation of the divergent system.

According to the vehicle-operation assisting device 1 of the first embodiment of the present invention, the operation-precision estimating circuit 7 estimates the steering operation accuracy "a", required in a state of the driving environment on a periphery of the vehicle, detected by the environment-state detecting device 3, the steering-system assistance control device 8 increases a control level of the steering system when the estimated steering operation accuracy "a" is higher. Thus, the vehicle operation assistance that matches the required steering operation precision in the current driving environment can be provided to the driver.

According to the vehicle-operation assisting device 1 of the first embodiment of the present invention, the ideal-steering-signal calculating circuit 5 inputs the information detected by the vehicle-operation-state detecting device 2 and the environment-state detecting device 3, into a driver model in which a value of the ideal steering angle Ŝ is 2·G·υ·(v/L) (v denotes a vehicle speed, and G denotes a steering gain of the vehicle), where υ denotes an angle formed by: a vector connecting the current vehicle position $P_0$ and the target travel location P; and the advancing direction of the vehicle thereby to calculate the ideal steering angle Ŝ. Thus, by the control path obtained by taking into consideration a steering characteristic of the driver, the steering operation of the driver can be assisted.

According to the vehicle-operation assisting device 1 of the first embodiment of the present invention, the steering-system assistance control device 8 controls a level of the repulsive force against the steering operation of the driver, written as the torque output rule, to control the control level of the steering system, and thus, it is possible to provide to the driver steering operation assistance by a torque change recognized by the driver via the steering system.

Second Embodiment

With reference to FIG. 10 to FIG. 14, a configuration of the vehicle-operation assisting device according to the second embodiment of the present invention is explained next.

Configuration of Vehicle-Operation Assisting Device

Figure 10:
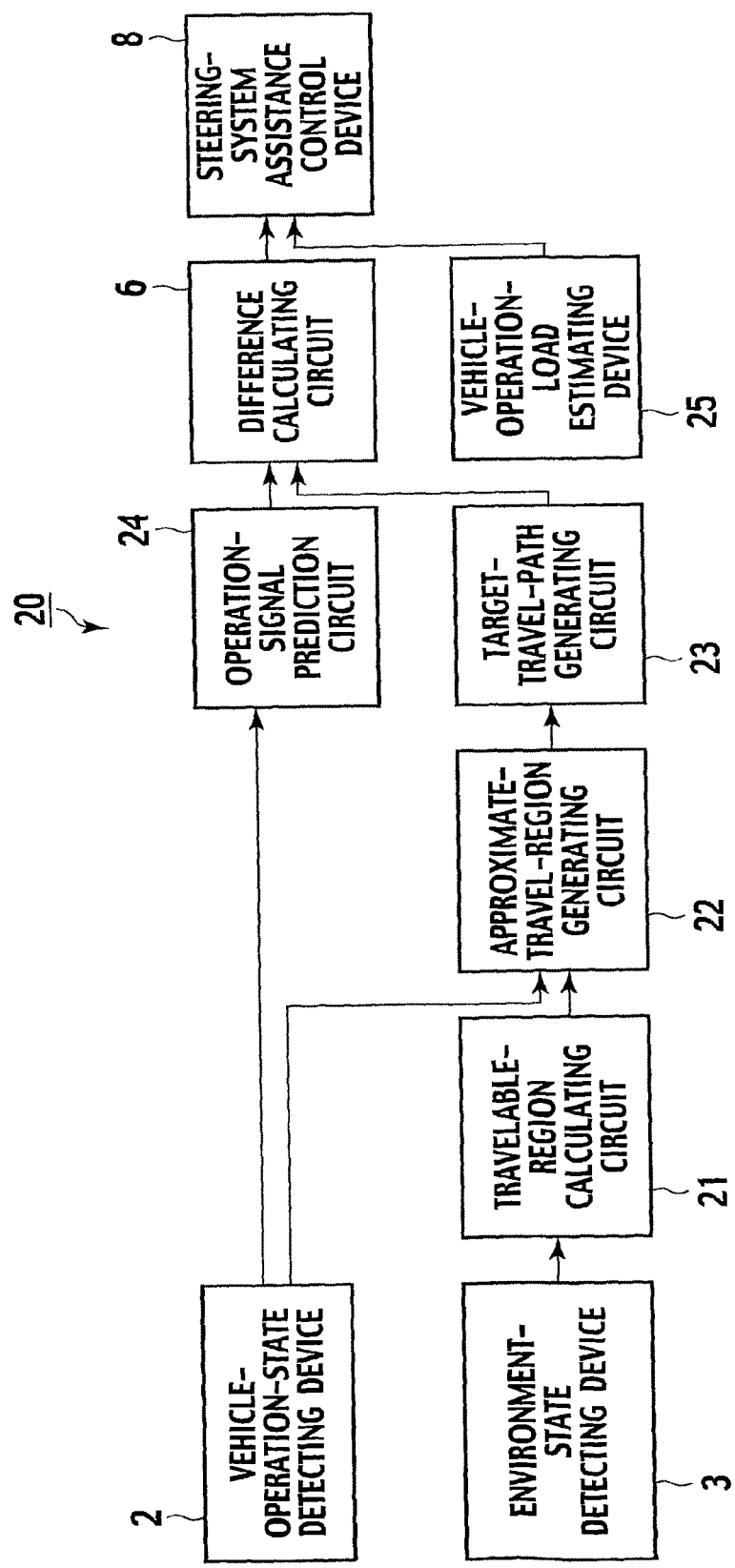
FIG. 10 is a block diagram showing the configuration of a vehicle-operation assisting device according to the second embodiment of the present invention.

As shown in FIG. 10, a vehicle-operation assisting device 20 according to the second embodiment of the present invention includes a travelable-region calculating circuit 21, an approximate-travel-region generating circuit 22, a target-travel-path generating circuit 23, an operation-signal prediction circuit 24, and a vehicle-operation-load estimating device 25, in addition to the vehicle-operation-state detecting device 2, the environment-state detecting device 3, the difference calculating circuit 6, and the steering-system assistance control device 8 in the vehicle-operation assisting device 10 according to the first embodiment.

The travelable-region calculating circuit 21, the approximate-travel-region generating circuit 22, the target-travel-path generating circuit 23, the operation-signal prediction circuit 24, and the vehicle-operation-load estimating device 25 correspond to a movable-region calculating means, an approximate-control-region calculating means, an ideal-control-path generating means, an operation-signal prediction means, and a vehicle-operation-load estimating means according to the present invention, respectively. These functions are realized by a microcomputer mounted on the vehicle executing a control program. The functions of the respective components are described later.

The vehicle-operation assisting device 20 having such a configuration executes a vehicle-operation-assistance control process shown below to output vehicle-operation assistance control suitable for a state of the vehicle operation of the vehicle by the driver or an environment on a periphery of the vehicle. With reference to a flowchart shown in FIG. 11, an operation of the vehicle-operation assisting device 20 when the vehicle-operation assistance control process is executed is explained below.

Vehicle-Operation Assistance Control Process

Figure 11:
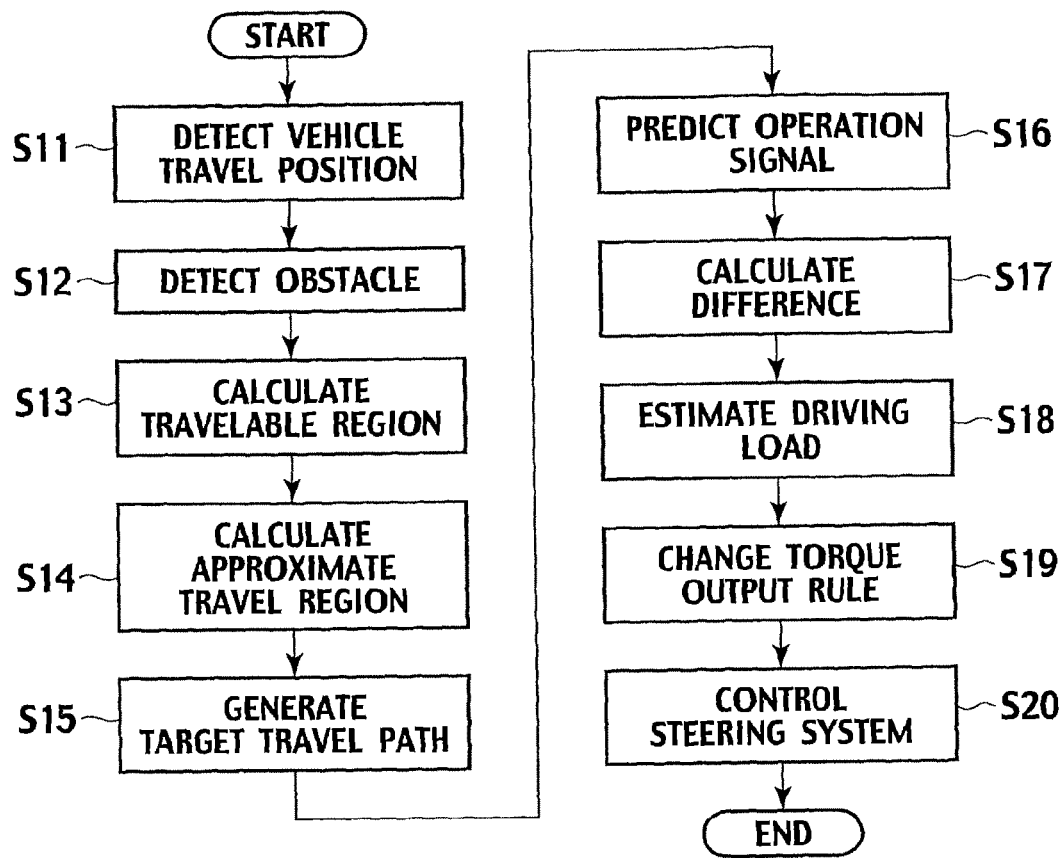
FIG. 11 is a flowchart showing the flow of the vehicle-operation assistance control process according to the second embodiment of the present invention.

The flowchart shown in FIG. 11 is started at a timing at which an ignition switch of the vehicle is switched from an off state to an on state, and the vehicle-operation assistance control process proceeds to a process at step S11. The vehicle-operation assistance control process is executed repeatedly for each predetermined control cycle.

In the process at step S11, the environment-state detecting device 3 calculates the horizontal direction distance $l_n$ between the center line $L_C$ of the traffic lane and the current position $P_0$ of the vehicle A (see FIG. 5) and a road width wr of the traffic lane (see FIG. 11). Thereby, the process at step S11 is completed, and the vehicle-operation assistance control process proceeds to a process at step S12.

Figure 12:
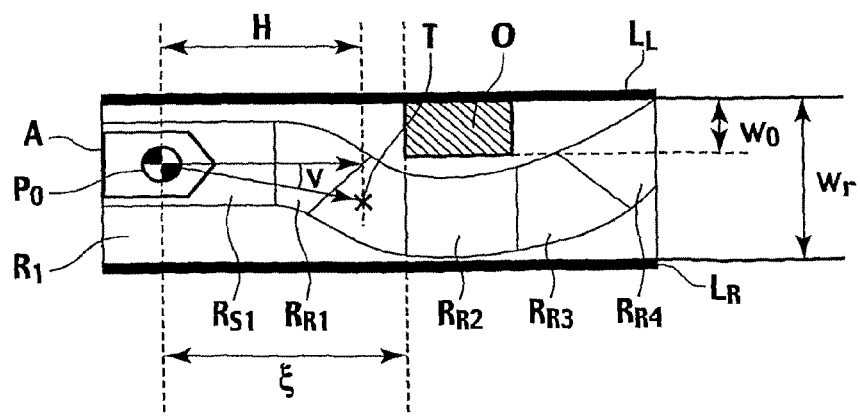
FIG. 12 is an explanatory diagram of a generation process of the target travel path of the vehicle at step S15 shown in FIG. 11.
Figure 13:
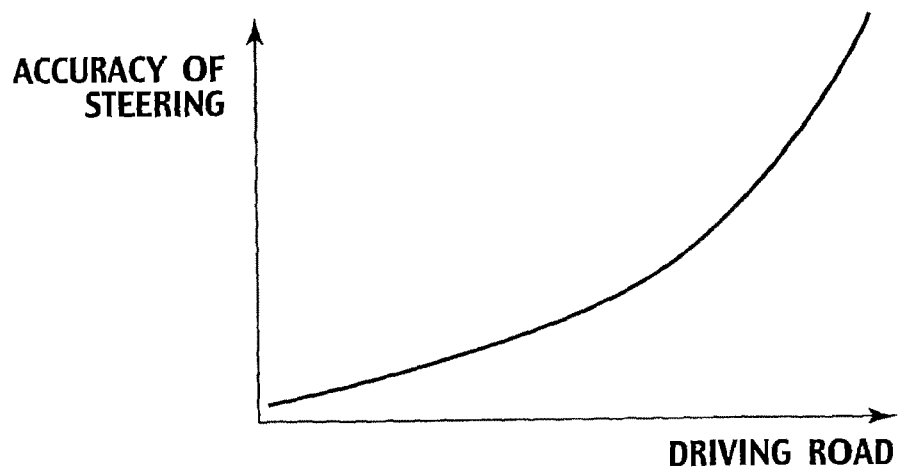
FIG. 13 is a graph showing one example of a relation between a driving load of a driver and an accuracy required for a steering operation.

In the process at step S12, the environment-state detecting device 3 determines whether there is an obstacle on the traffic lane on which the vehicle travels. When there is the obstacle, the environment-state detecting device 3 detects a distance ξ from the current position $P_0$ of the vehicle A to an obstacle O and a width $w_O$ of the obstacle, as shown in FIG. 12. Thereby, the process at step S12 is completed, and the vehicle-operation assistance control process proceeds to a process at step S13.

In the process at step S13, the travelable-region calculating circuit 21 calculates a region over which the vehicle can travel within a traffic-lane region. More specifically, the travelable-region calculating circuit 21 calculates a travelable region $R_1$ from the width wr of the traffic lane of the vehicle A, the distance ξ to the obstacle O, and the obstacle $w_O$, detected in the processes at steps S11 and S12, as shown in FIG. 12. Thereby, the process at step S13 is completed, and the vehicle-operation assistance control process proceeds to a process at step S14.

In the process at step S14, the approximate-travel-region generating circuit 22 approximately generates a travel region, which corresponds to the traffic lane, within the travelable region $R_1$ calculated by the process at step S13. More specifically, the approximate-travel-region generating circuit 22 previously holds templates of a curved route and a straight route, each having a predetermined road width, and determines, as an approximate travel region, a combination of a curved-route template and a straight-route template (in an example shown in FIG. 12, a combination of curved-route templates $R_{R1}$, $R_{R2}$, $R_{R3}$, and $R_{R4}$ and a straight-route template $R_{S1}$) that provides a largest area when the combination of the curved-route template and the straight-route template is applied within the travelable region $R_1$, as shown in FIG. 12. Thereby, the process at step S14 is completed, and the vehicle-operation assistance control process proceeds to a process at step S15.

In the process at step S15, the target-travel-path generating circuit 23 calculates, as a target travel path, a route of the vehicle that travels in the approximate travel region generated by the process at step S14. More specifically, as shown in FIG. 11, the target-travel-path generating circuit 23 calculates, as the target travel path, a route traveled by an ideal steering angle S' evaluated from an equation S'=G×H×υ, where T denotes a central point of the approximate travel region H meters ahead of the current position $P_0$ of the vehicle A and υ denotes an angle formed by: a vector connecting the current position $P_0$ of the vehicle A and the central point T; and the advancing direction of its own vehicle. In the second embodiment, a value of H is 15 [m] and a value of G is 0.15. However, the value of G is desirably changed according to a type of vehicle, a driver, and a state of an environment. Thereby, the process at step S15 is completed, and the vehicle-operation assistance control process proceeds to a process at step S16.

In the process at step S16, the operation-signal prediction circuit 24 utilizes the information detected by the vehicle-operation-state detecting device 2 to calculate a left-and-right direction position and an advancing direction angle of the vehicle within the route after an elapse of 1 second. In the second embodiment, for the left-and-right direction position, a left-and-right position in the approximate travel region calculated by the process at step S14, more specifically, a position at which the vehicle reaches when the ideal steering angle S' for realizing the target travel path calculated by the process at step S15 is maintained for 1 second, is adopted. The advancing direction angle is a advancing direction angle of the vehicle on the target travel path calculated by the process at step S15, more specifically, an angle by which the vehicle rotates when the ideal steering angle S' for realizing the target travel path calculated by the process at step S15 is maintained for 1 second. Thereby, the process at step S16 is completed, and the vehicle-operation assistance control process proceeds to a process at step S17.

In the process at step S17, the difference calculating circuit 6 calculates a difference between the left-and-right direction position and the advancing direction angle calculated by the process at step S16 for the target travel path calculated by the process at step S15. More specifically, the difference calculating circuit 6 calculates a relative distance between the vehicle position and the target travel path of the vehicle after an elapse of 1 second to calculate a positional difference d, and calculates a relative angle between the advancing direction angle and the target travel path of the vehicle after an elapse of 1 second to calculate a difference $\phi$ of the advancing direction angle. Thereby, the process at step S17 is completed, and the vehicle-operation assistance control process proceeds to a process at step S18.

In the process at step S18, the vehicle-operation-load estimating device 25 estimates a vehicle-operation load WL of the driver. In the second embodiment, the vehicle-operation-load estimating device 25 uses a steering entropy method known by the time of the application of the invention of the subject application to estimate the vehicle-operation load WL of the driver. However, a physiological barometer, etc., such as a cardiac rate, of the driver can be used to estimate the same. The vehicle-operation load WL of the driver becomes larger as the required steering operation accuracy "a" becomes larger, as shown in FIG. 12, and has a correlation with the steering operation accuracy "a". Thereby, the process at step S18 is completed, and the vehicle-operation assistance control process proceeds to a process at step S19.

In the process at step S19, the steering-system assistance control device 8 changes the torque output rule based on the positional difference d and the difference $\phi$ of the advancing direction angle calculated by the process at step S17 and the vehicle-operation load WL of the driver estimated by the process at step S18. In the second embodiment, the torque output rule is expressed as in an equation of: $T=K1\times(K2\times d+K3\times\phi)$. A constant of proportion K1 in the equation is a function, written as $K1=F(WL)=b\times WL$, for example, of the vehicle-operation load WL of the driver. That is, in the second embodiment, the generated torque T is changed according to a magnitude of the vehicle-operation load WL of the driver. More specifically, a torque generated as the vehicle-operation load WL (=required steering operation accuracy) of the driver becomes larger becomes larger. On the other hand, a torque generated as the vehicle-operation load WL (=required steering operation accuracy) of the driver becomes smaller becomes smaller. Thereby, the process at step S19 is completed, and the vehicle-operation assistance control process proceeds to a process at step S20.

In the process at step S20, the steering-system assistance control device 8 implements control for generating the steering torque to a steering wheel. Thereby, the process at step S20 is completed, and a series of vehicle-operation assistance control processes are ended.

As is obvious from the explanations, according to the vehicle-operation assisting device 20 of the second embodiment of the present invention, the operation-signal prediction circuit 24 calculates the left-and-right direction position and the advancing direction angle of the vehicle after an elapse of 1 second, and the difference calculating circuit 6 calculates the difference between the left-and-right direction position and the advancing direction angle for the target travel path. According to such a configuration, even in a travel environment in which an obstacle is present, it is possible to provide to the driver steering operation assistance that matches a feeling of the driver.

According to the vehicle-operation assisting device 20 of the second embodiment of the present invention, the vehicle-operation-load estimating device 25 estimates the vehicle-operation load WL of the driver, and the steering-system assistance control device 8 increases the control level of the steering system in proportion to the vehicle-operation load WL. According to such a configuration, the higher the vehicle-operation load WL of the driver, the larger the steering torque, transmitted to the driver, in the steering wheel. Thus, it is possible to provide the driver with the vehicle operation assistance in which a steering operation delay or an unstable steering operation resulting from an excessive driving load is inhibited.

Figure 14:
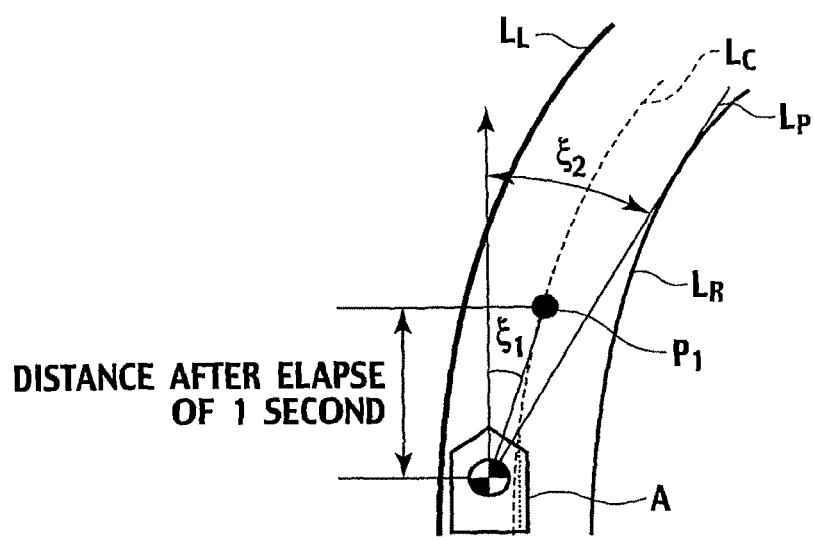
FIG. 14 is an explanatory diagram of a modification of the generation process of the target travel path of the vehicle at step S15 shown in FIG. 11.

In the process at step S15, the target-travel-path generating circuit 23 calculates, as the target travel path, the route when traveled by the ideal steering angle S' evaluated by an equation $S'=G\times H\times v$. However, a route when traveled by an ideal steering angle S' evaluated by an equation $S'=G_1\times\xi_1+G_2\times\xi_2$, for example, can be calculated as the target travel path. The parameter $\xi_1$ in the equation indicates an angle formed by the current advancing direction of the vehicle A and a position $P_1$ on the center line $L_C$ after an elapse of 1 second, as shown in FIG. 14. The parameter $\xi_2$ indicates an angle formed by a tangential line $L_P$ that circumscribes an inner border $L_R$ on a curved route ahead of the vehicle A and the advancing direction of the vehicle A. The parameters $G_1$ and $G_2$ in the equation are desirably changed according to the vehicle, the driver, and the travel environment.

Third Embodiment

With reference to FIG. 15 to FIG. 18, a configuration of a vehicle-operation assisting device according to the third embodiment of the present invention is explained next.

Configuration of Vehicle-Operation Assisting Device

Figure 15:
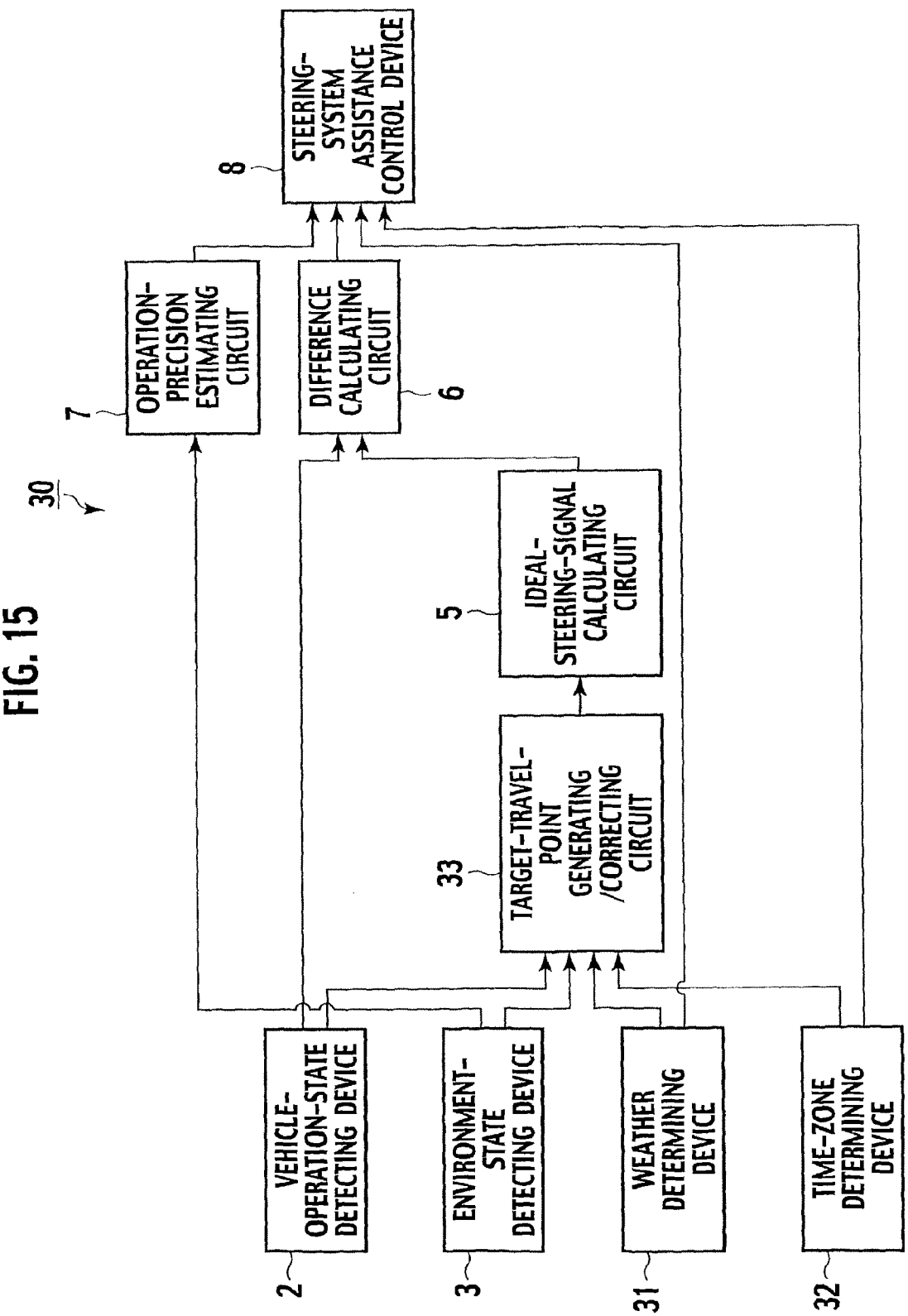
FIG. 15 is a block diagram showing a configuration of a vehicle-operation assisting device according to a third embodiment of the present invention.

As shown in FIG. 15, a vehicle-operation assisting device 30 according to the third embodiment of the present invention includes a weather determining device 31, a time-zone determining device 32, and a target-travel-point generating/correcting circuit 33, in addition to the vehicle-operation-state detecting device 2, the environment-state detecting device 3, the ideal-steering-signal calculating circuit 5, the difference calculating circuit 6, the operation-precision estimating circuit 7, and the steering-system assistance control device 8 in the vehicle-operation assisting device 10 according to the first embodiment.

The weather determining device 31 corresponds to a weather determining means according to the present invention. The weather determining device 31 includes a rain sensor and an illumination sensor, and determines the weather at a time of driving and operating the vehicle. The time-zone determining device 32 corresponds to a time-zone determining means according to the present invention. The time-zone determining device 32 includes a measuring device such as a clock, and determines a time zone at a time of driving and operating the vehicle. The target-travel-point generating/correcting circuit 33 corresponds to the ideal-control-path generating means according to the present invention. A function of the target-travel-point generating/correcting circuit 33 is realized by a microcomputer mounted on the vehicle executing a control program. The function of the target-travel-point generating/correcting circuit 33 is described later.

The vehicle-operation assisting device 30 having such a configuration executes a vehicle-operation-assistance control process shown below to output vehicle-operation assistance control suitable for a state of the vehicle operation of the vehicle by the driver or an environment on a periphery of the vehicle. With reference to a flowchart shown in FIG. 15, an operation of the vehicle-operation assisting device 30 when the vehicle-operation assistance control process is executed is explained below.

Vehicle-Operation Assistance Control Process

Figure 16:
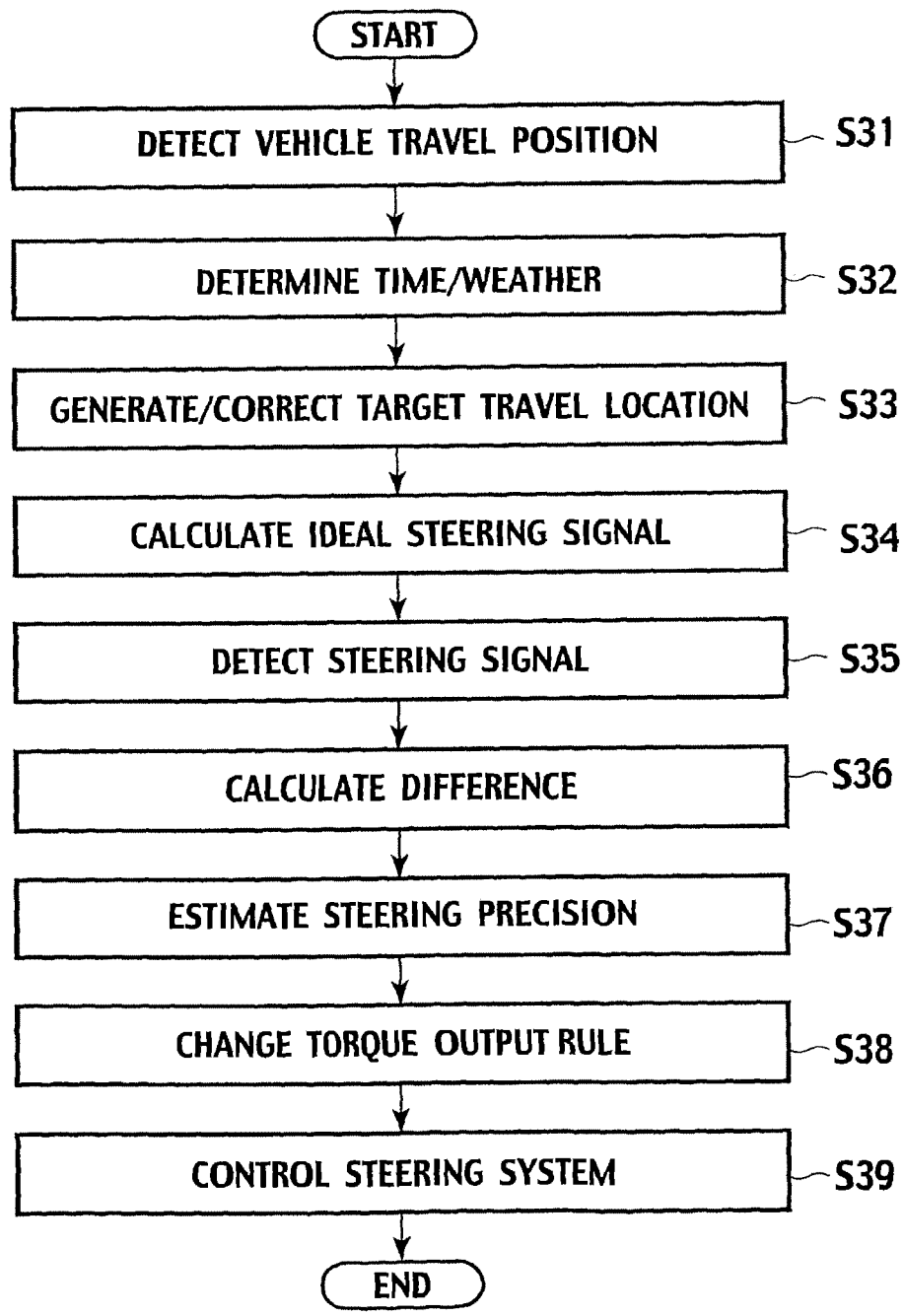
FIG. 16 is a flowchart showing a flow of a vehicle-operation assistance control process according to the third embodiment of the present invention.
Figure 18:
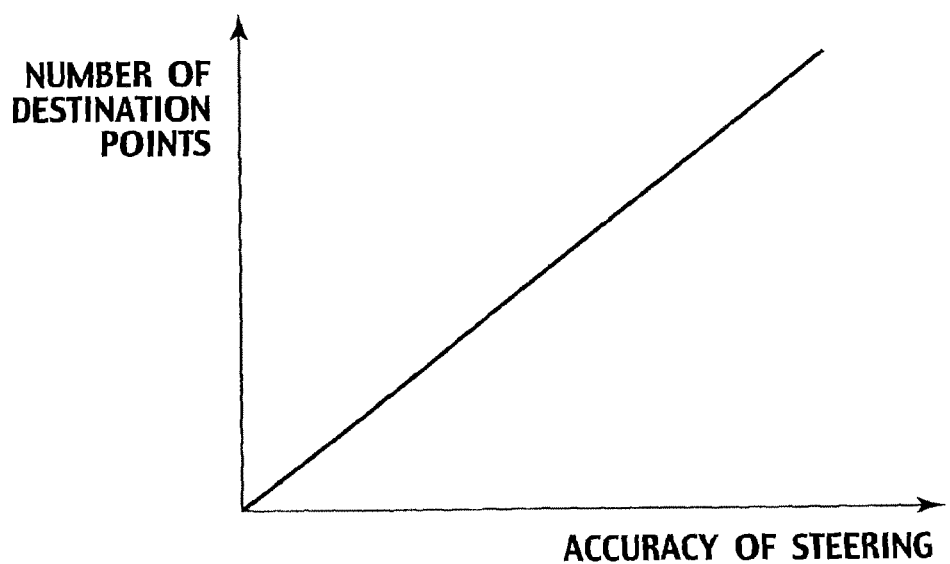
FIG. 18 is a graph showing one example of a relation between the accuracy required for the steering operation and the number of target travel locations set when the target travel path is generated.

The flowchart shown in FIG. 16 is started at a timing at which the ignition switch of the vehicle is switched from an off state to an on state, and the vehicle-operation assistance control process proceeds to a process at step S31. The vehicle-operation assistance control process is executed repeatedly for each predetermined control cycle. The process at step S31 is the same as that at step S1 shown in FIG. 4, and thus descriptions thereof will be omitted below, and the description is started from a process at step S32.

In the process at step S32, the weather determining device 31 deter mines the weather on a periphery of the vehicle, and the time-zone determining device 32 determines a current time zone. More specifically, when a rain drop is detected by the rain sensor, the weather determining device 31 determines that the weather on a periphery of the vehicle is rain. The time-zone determining device 32 determines by segmenting the current time zone into early morning, daytime, evening, and nighttime. Thereby, the process at step S32 is completed, and the vehicle-operation assistance control process proceeds to a process at step S33.

In the process at step S33, the target-travel-point generating/correcting circuit 33 generates and corrects the target travel location based on a process result at step S32. More specifically, the target-travel-point generating/correcting circuit 33 calculates a lane central position in the vehicle advancing direction as the target travel location at which the vehicle should pass in the future, based on the current vehicle position detected by the process at step S31. Subsequently, when the weather determined by the process at step S32 indicates rain or the time zone determined thereby indicates the nighttime, the target-travel-point generating/correcting circuit 33 corrects the calculated target travel location to the lane central position H1[m] ahead. When the weather is fine and the time zone is early morning or evening, the target-travel-point generating/correcting circuit 33 corrects the calculated target travel location to the lane central position H2 (>H1)[m] ahead. In another case, when the weather is fine and the time zone is daytime, the target-travel-point generating/correcting circuit 33 corrects the calculated target travel location to the lane central position H3(>H2)[m] ahead. Thereby, the process at step S33 is completed, and the vehicle-operation assistance control process proceeds to a process at step S34.

In the process at step S34, the ideal-steering-signal calculating circuit 5 calculates the ideal steering angle $\hat{S}$ to reach the target travel location calculated by the process at step S33. More specifically, the ideal-steering-signal calculating circuit 5 inputs the information detected by the vehicle-operation-state detecting device 2 and the environment-state detecting device 3, into a driver model in which a value of the ideal steering angle $\hat{S}$ is $2 \cdot G'' \cdot \upsilon \cdot (v/L)$ (v denotes a vehicle speed, and G" denotes a steering gain of the vehicle), where $\upsilon$ denotes an angle formed by: a vector connecting the current vehicle position $P_0$ and the target travel location P; and the vehicle advancing direction thereby to calculate the ideal steering angle $\hat{S}$ to reach the target travel location calculated by the process at step S33. The steering gain G" is G1 when the weather determined by step S32 is rain or the time zone determined thereby is nighttime; G2(<G1) when the weather is fine and the time zone is early morning or evening; and G3(<G2) when the weather is fine and the time zone is daytime. Thereby, the process at step S34 is completed, and the vehicle-operation assistance control process proceeds to a process at step S35.

In the process at step S35, the vehicle-operation-state detecting device 2 detects a current vehicle steering angle S. Thereby, the process at step S35 is completed, and the vehicle-operation assistance control process proceeds to a process at step S36.

In the process at step S36, the difference calculating circuit 6 calculates a difference $\delta(=\hat{S}-S)$ between: the ideal steering angle $\hat{S}$ calculated by the process at step S34; and the current vehicle steering angle S detected by the process at step S35. Thereby, the process at step S36 is completed, and the vehicle-operation assistance control process proceeds to a process at step S37.

In the process at step S37, the operation-precision estimating circuit 7 estimates: the weather on a periphery of the vehicle determined by the process at step S32; and the steering accuracy "a" required in the current time zone. Generally, the steering operation accuracy "a" is correlated with the weather on a periphery of the vehicle, the illumination, and the time zone over which the vehicle travels, as shown in FIGS. 17(a), 17(b), and 17(c). Accordingly, in the third embodiment, the operation-precision estimating circuit 7 previously holds maps shown in FIGS. 16(a), 16(b), and 16(c), and reads out from the maps the weather on a periphery of the vehicle determined by the process at step S32 and the steering accuracy "a" corresponding to the current time zone to estimate the required steering accuracy "a". Thereby, the process at step S37 is completed, and the vehicle-operation assistance control process proceeds to a process at step S38.

In the process at step S38, the steering-system assistance control device 8 changes the torque output rule based on: the horizontal direction distance $l_n$ between the center line $L_C$ of the traffic lane of the vehicle and the traveling position of the vehicle A, detected by the process at step S31; the difference $\delta$ between the ideal steering angle $\hat{S}$ and the current vehicle steering angle S, calculated by the process at step S36; and the steering operation accuracy "a" estimated by the process at step S37. Thereby, the process at step S38 is completed, and the vehicle-operation assistance control process proceeds to a process at step S39.

In the process at step S39, the steering-system assistance control device 8 implements control for generating the steering torque to a steering wheel. Thereby, the process at step S39 is completed, and a series of vehicle-operation assistance control processes are ended.

As is obvious from the explanations, according to the vehicle-operation assisting device 30 of the third embodiment of the present invention, the weather determining device 31 deter mines the weather at a time of the vehicle operation, and the time-zone determining device 32 determines the time zone at a time of the vehicle operation. When the weather determined by the weather determining device 31 is bad and/or the time zone determined by the time-zone determining device 32 is nighttime, the target-travel-point generating/correcting circuit 33 corrects a position of the target travel location according to the determined weather and time zone, and the steering-system assistance control device 8 increases the control level of the steering system. This makes it possible to provide the driver with more stable vehicle operation assistance.

In the present embodiment, the target-travel-point generating/correcting circuit 33 calculates one target travel location only at a single process. However, a plurality of target travel locations can be chronologically calculated by the single process. In this case, the target-travel-point generating/correcting circuit 33 can change the number of calculated target travel locations according to the steering accuracy "a" calculated by the process at step S37, as shown in FIG. 17.

Fourth Embodiment

Figure 19:
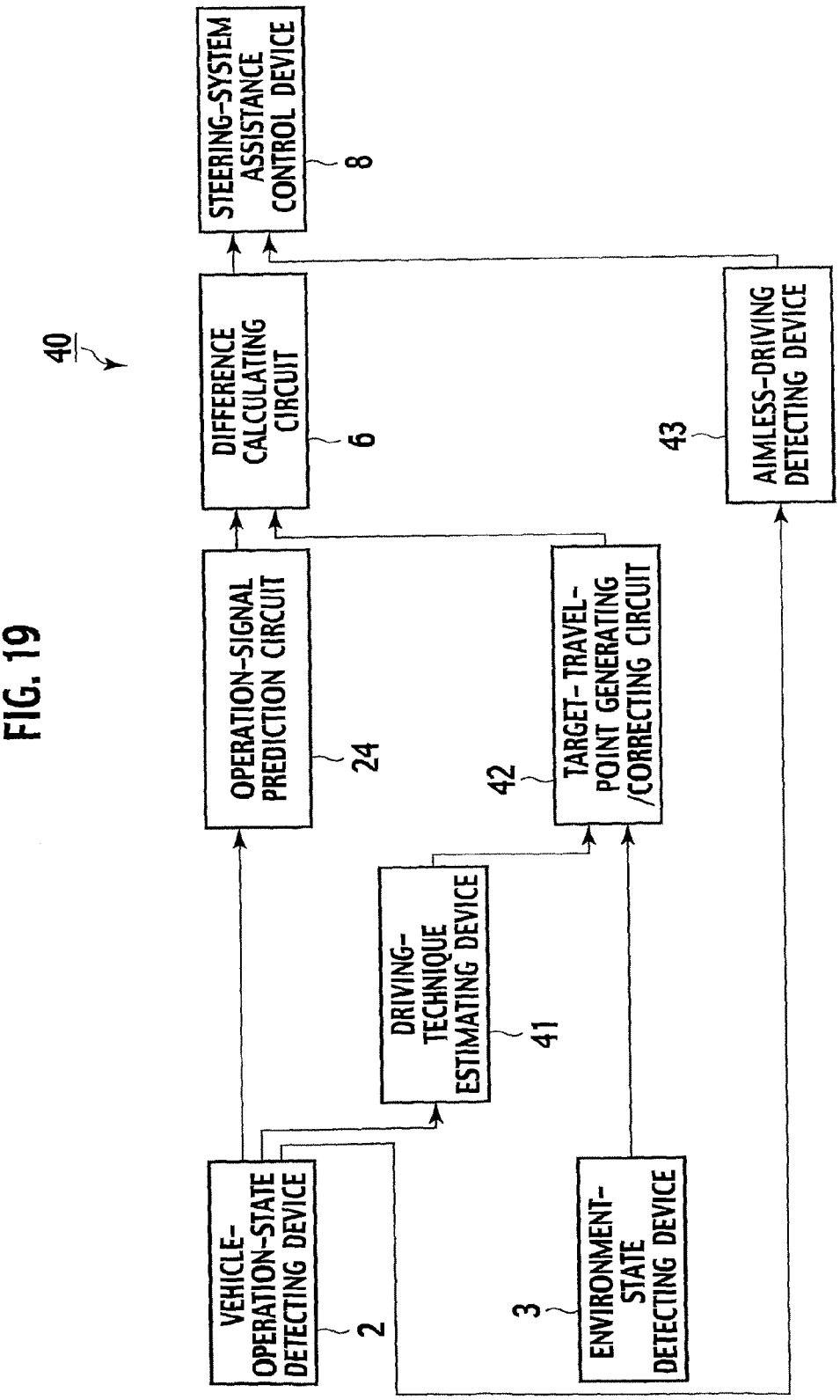
FIG. 19 is a block diagram showing a configuration of a vehicle-operation assisting device according to a fourth embodiment of the present invention.

With reference to FIG. 19 to FIG. 23, a configuration of a vehicle-operation assisting device according to a fourth embodiment of the present invention is explained next.
Configuration of Vehicle-Operation Assisting Device As shown in FIG. 19, a vehicle-operation assisting device 40 according to the fourth embodiment of the present invention includes a driving-technique estimating device 41, a target-travel-point generating/correcting circuit 42, and an aimless-driving detecting device 43, in addition to the vehicle-operation-state detecting device 2, the environment-state detecting device 3, the difference calculating circuit 6, the steering-system assistance control device 8 in the vehicle-operation assisting device 10 according to the first embodiment, and the operation-signal prediction circuit 24 in the vehicle-operation assisting device 20 according to the second embodiment.

The driving-technique estimating device 41 corresponds to a vehicle-operation-technique estimating means according to the present invention. The driving-technique estimating device 41 utilizes a technique for estimating a driving technique of the driver, which is known by the time of the application of the invention of the subject application, from frequency of modified steerings in the steering operation of the driver to estimate the driving technique of the driver. The target-travel-point generating/correcting circuit 42 corresponds to the ideal-control-path generating means according to the present invention. A function (operation) of the target-travel-point generating/correcting circuit 42 is realized by a microcomputer mounted on the vehicle executing a control program. A function of the target-travel-point generating/correcting circuit 42 is described later. The aimless-driving detecting device 43 corresponds to an aimless-operation-driving detecting means according to the present invention. The aimless-driving detecting device 43 utilizes a technique for detecting an aimless driving, which is known by the time of the application of the invention of the subject application, from a length of a time in which the steering is not implemented in the steering operation of the driver and a generation frequency thereof to estimate an aimless driving of the driver.

Figure 20:
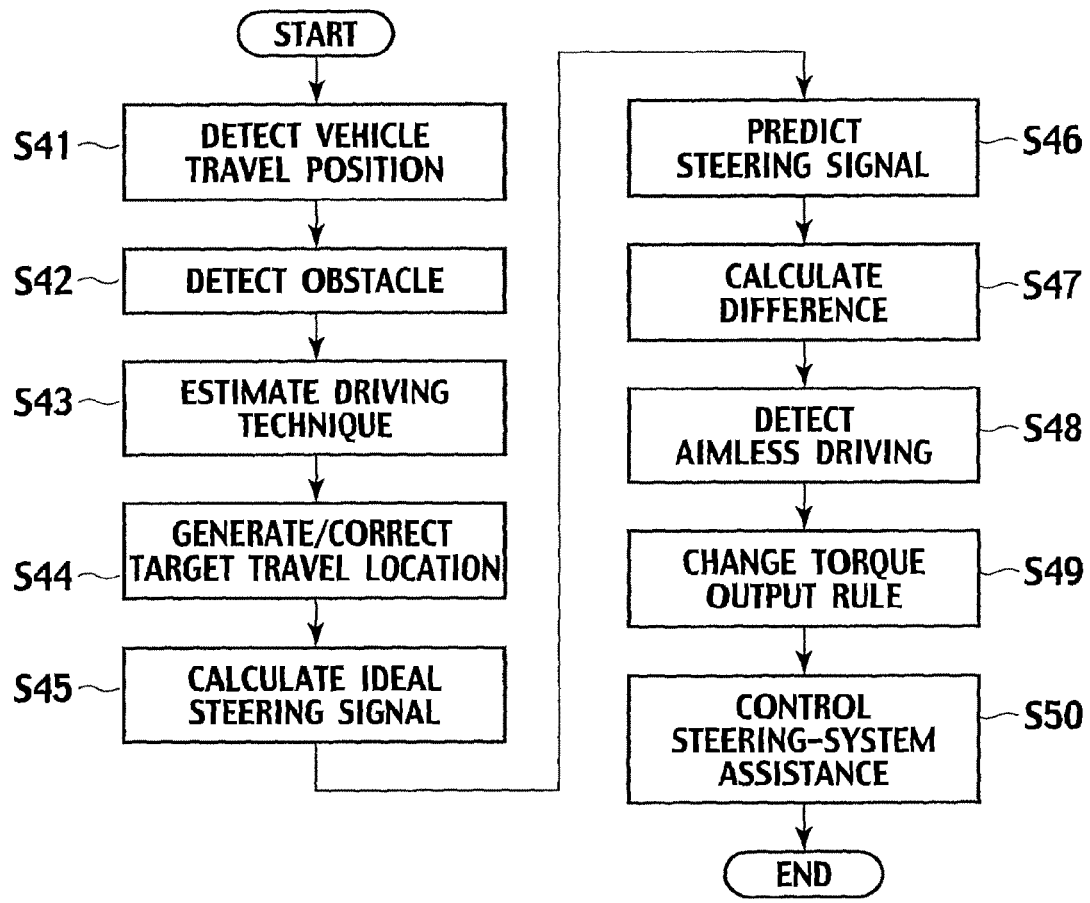
FIG. 20 is a flowchart showing the flow of the vehicle-operation assistance control process according to the fourth embodiment of the present invention.

The vehicle-operation assisting device 40 having such a configuration executes a vehicle-operation-assistance control process shown below to output vehicle-operation assistance control suitable for a state of the vehicle operation of the vehicle by the driver or an environment on a periphery of the vehicle. With reference to a flowchart shown in FIG. 19, an operation of the vehicle-operation assisting device 40 when the vehicle-operation assistance control process is executed is explained below.
Vehicle-Operation Assistance Control Process The flowchart shown in FIG. 20 is started at a timing at which the ignition switch of the vehicle is switched from an off state to an on state, and the vehicle-operation assistance control process proceeds to a process at step S41. The vehicle-operation assistance control process is executed repeatedly for each predetermined control cycle. The processes at steps S41 and S42 are the same as those at steps S11 and S12 shown in FIG. 11, and thus descriptions thereof will be omitted. The description is started from a process at step S43.

In the process at step S43, the driving-technique estimating device 41 estimates the driving technique of the driver. In the present embodiment, the driving-technique estimating device 41 estimates that the higher the frequency of the modified steerings detected via the steering angle sensor provided in the vehicle-operation-state detecting device 2, the lower the driving technique of the driver. Thereby, the process at step S43 is completed, and the vehicle-operation assistance control process proceeds to a process at step S44.

Figure 21:
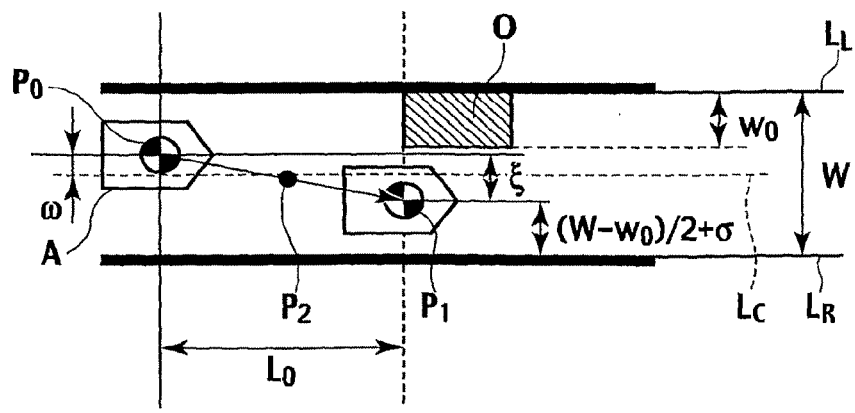
FIG. 21 is an explanatory diagram of generation and correction processes of the target travel location at step S44 shown in FIG. 20.

In the process at step S44, the target-travel-point generating/correcting circuit 42 generates and corrects the target travel location based on the driving technique of the driver, estimated by the process at step S43. More specifically, the target-travel-point generating/correcting circuit 42 calculates, as the target travel location, a middle position $P_1$ of a route width on which the vehicle A can travel when the vehicle A reaches a position of an obstacle O, as shown in FIG. 21. The target-travel-point generating/correcting circuit 42 corrects the position of the target travel location as close as possible to the obstacle O when the driving technique of the driver estimated by the process at step S43 is high. That is, as shown in FIG. 21, when the vehicle A is positioned at the position $P_0$ offset only by the distance $\omega$ from the center of the traffic lane, in order for the vehicle A to reach a position $P_1$ during a time that the vehicle A travels a distance $L_0[m]$, the vehicle needs to move in right and left directions by a distance $\zeta(=\omega+w_0/2)$ only. When the driving technique estimated by the process at step S43 is high, the target-travel-point generating/correcting circuit 42 subtracts a distance $\sigma$ from the distance $\zeta$ in order to obtain the target travel location brought as close as possible to the obstacle, and sets, as an intermediate point to reach from the position $P_0$ to the position $P_1$, a position $P_2$ which is a point at $(L_0/2, \zeta/2)$ relatively from the position $P_0$. Thereby, the process at step S44 is completed, and the vehicle-operation assistance control process proceeds to a process at step S45.

In the process at step S45, the ideal-steering-signal calculating circuit 5 calculates the ideal steering angle $\hat{S}$ to reach the target travel location calculated by the process at step S44. More specifically, the ideal-steering-signal calculating circuit 5 inputs the information detected by the vehicle-operation-state detecting device 2 and the environment-state detecting device 3, into a driver model in which the value of the ideal steering angle $\hat{S}$ is $G\times(L_0/2)\times(\zeta/2)$ (G denotes a steering gain of the vehicle) during a time that the vehicle A is moving from the position $P_0$ to the position $P_2$, or into a driver model in which the value of the ideal steering angle $\hat{S}$ is $-G\times(L_0/2)\times(\zeta/2)$ during a time that the vehicle A is moving from the position $P_2$ to the position $P_1$, whereby the ideal steering angle $\hat{S}$ to reach the target travel location calculated by the process at step S44 is calculated. Thereby, the process at step S44 is completed, and the vehicle-operation assistance control process proceeds to a process at step S45.

In the process at step S46, the operation-signal prediction circuit 24 utilizes the information detected by the vehicle-operation-state detecting device 2 to calculate a left-and-right direction position and an advancing direction angle of the vehicle after an elapse of 1 second. This process is the same as that at step S16 shown in FIG. 11, and thus detailed descriptions thereof will be omitted. Thereby, the process at step S46 is completed, and the vehicle-operation assistance control process proceeds to a process at step S47.

In the process at step S47, the difference calculating circuit 6 calculates a difference between the left-and-right direction position and the advancing direction angle calculated by the process at step S46 for the ideal steering angle Ŝ calculated by the process at step S45. This process is the same as that at step S17 shown in FIG. 10, and thus detailed descriptions thereof will be omitted. Thereby, the process at step S47 is completed, and the vehicle-operation assistance control process proceeds to a process at step S48.

In the process at step S48, the aimless-driving detecting device 43 determines whether the driver performs the aimless driving. More specifically, the aimless-driving detecting device 43 determines that the driver performs the aimless driving when the frequency of steerings detected via the steering angle sensor provided in the vehicle-operation-state detecting device 2 is small. Thereby, the process at step S48 is completed, and the vehicle-operation assistance control process proceeds to a process at step S49.

Figure 22:
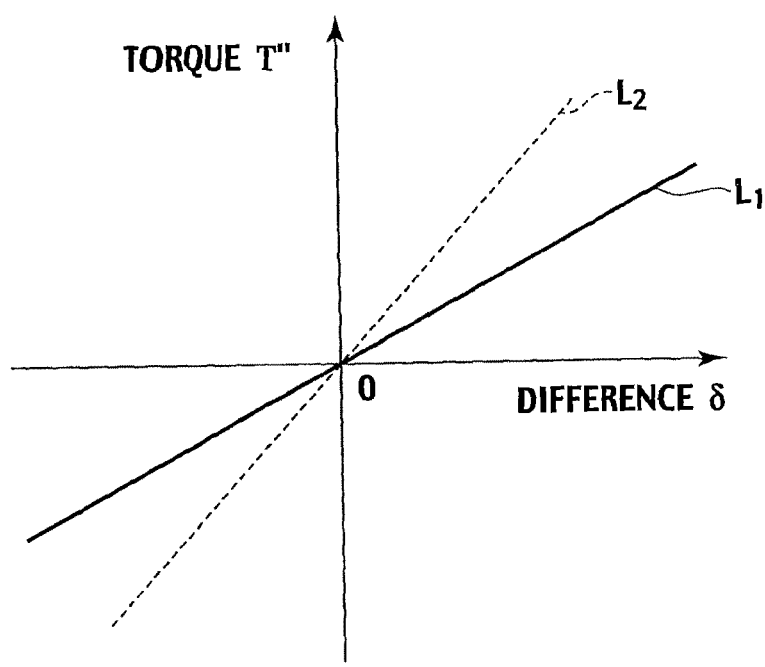
FIG. 22 is a graph showing one example of the torque output rule used for the process at step S50 shown in FIG. 20.
Figure 23:
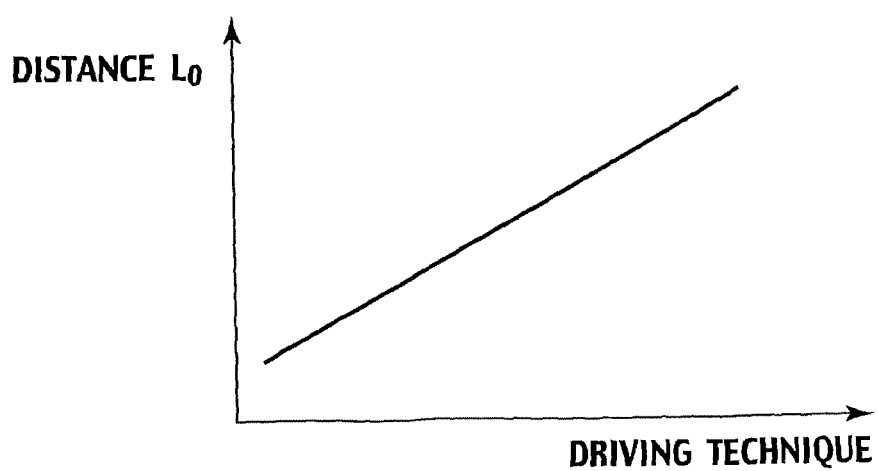
FIG. 23 is a graph showing one example of a relation between a driving technique of the driver and a distance $L_0$ shown in FIG. 21.

In the process at step S49, the steering-system assistance control device 8 changes the torque output rule based on a result of a determination process at step S48. In the present embodiment, the torque output rule is that in a power-assist mechanism for generating a torque in proportion to a magnitude of the difference δ between the ideal steering angle Ŝ and current steering angle S of the vehicle, as indicated by a solid line $L_1$ in FIG. 22. The torque T can be expressed as T=K×δ, where K denotes a constant of proportion. When the aimless driving of the driver is detected, the torque output rule is changed as indicated by a dotted line L2 in which the constant of proportion shown in FIG. 22 is larger than the constant of proportion K, and as a result, a torque larger than usual is outputted. Thereby, the process at step S49 is completed, and the vehicle-operation assistance control process proceeds to a process at step S50.

In the process at step S50, the steering-system assistance control device 8 implements control for generating the steering torque to a steering wheel. Thereby, the process at step S50 is completed, and a series of vehicle-operation assistance control processes are ended.

As is obvious from the explanations, according to the vehicle-operation assisting device 40 of the fourth embodiment of the present invention, the driving-technique estimating device 41 estimates the driving technique of the driver. When the driving technique of the driver is low, the target-travel-point generating/correcting circuit 42 corrects the target travel location, and the steering-system assistance control device 8 increases the control level of the steering system. Thus, the target travel location generated for guiding and assisting the driver can be corrected to that suits the driving technique of the driver, and as a result, it becomes possible to provide the driver with vehicle operation assistance by the target travel path that suits the technique of the driver.

According to the vehicle-operation assisting device 40 of the fourth embodiment of the present invention, when the aimless driving of the driver is detected by the aimless-driving detecting device 43, the steering-system assistance control device 8 increases the steering torque in the steering wheel transmitted to the driver, and thus, it is possible to provide the driver with vehicle operation assistance in which a steering delay or an unstable steering resulting from the aimless driving is inhibited. In the process at step S44, the distance $L_0$ is a fixed value. However, as shown in FIG. 22, the distance $L_0$ can be changed according to a magnitude of the driving technique of the driver.

Fifth Embodiment

Figure 24:
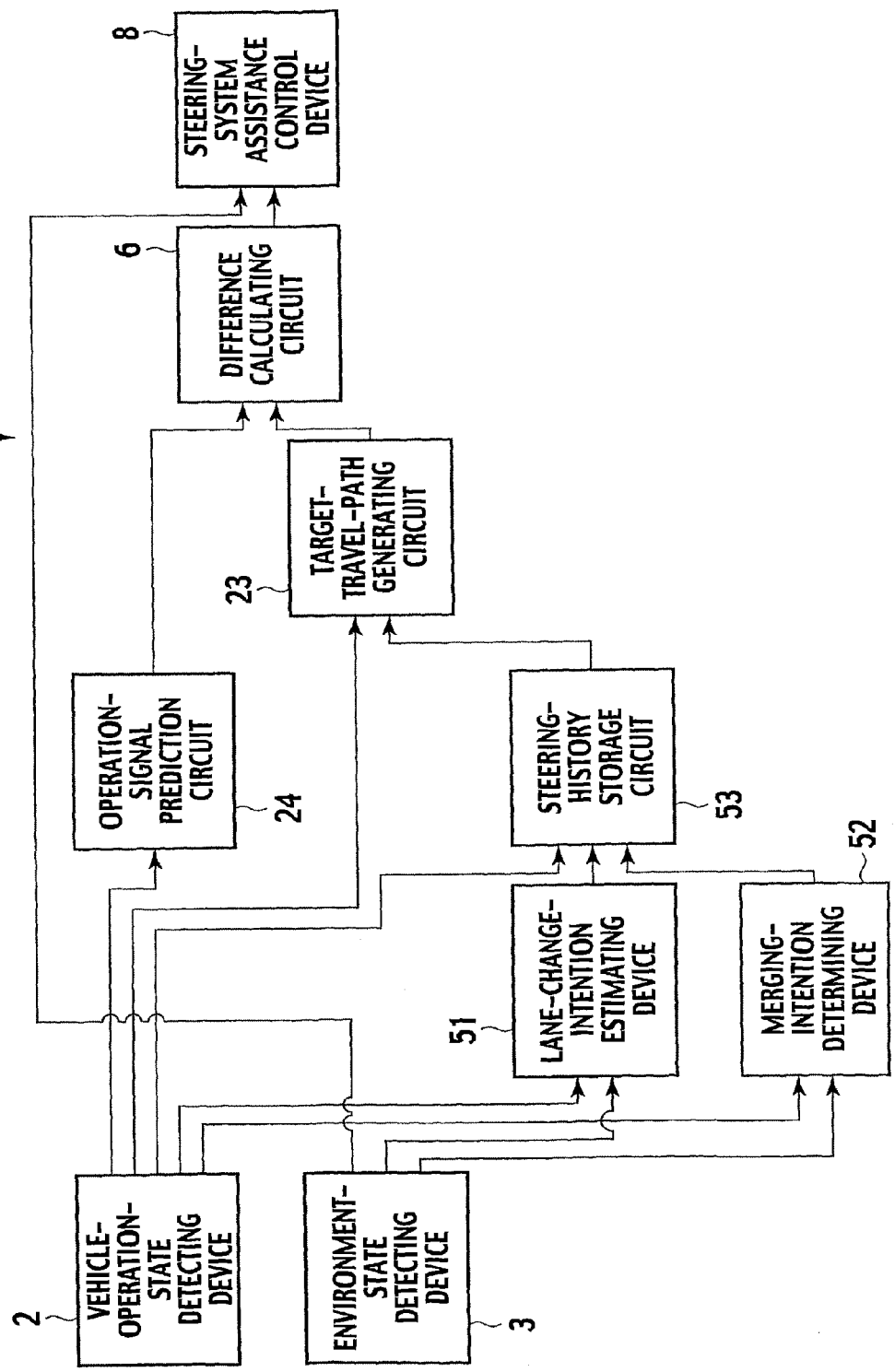
FIG. 24 is the block diagram showing a configuration of the vehicle-operation assisting device according to the fifth embodiment of the present invention.
Figure 25:
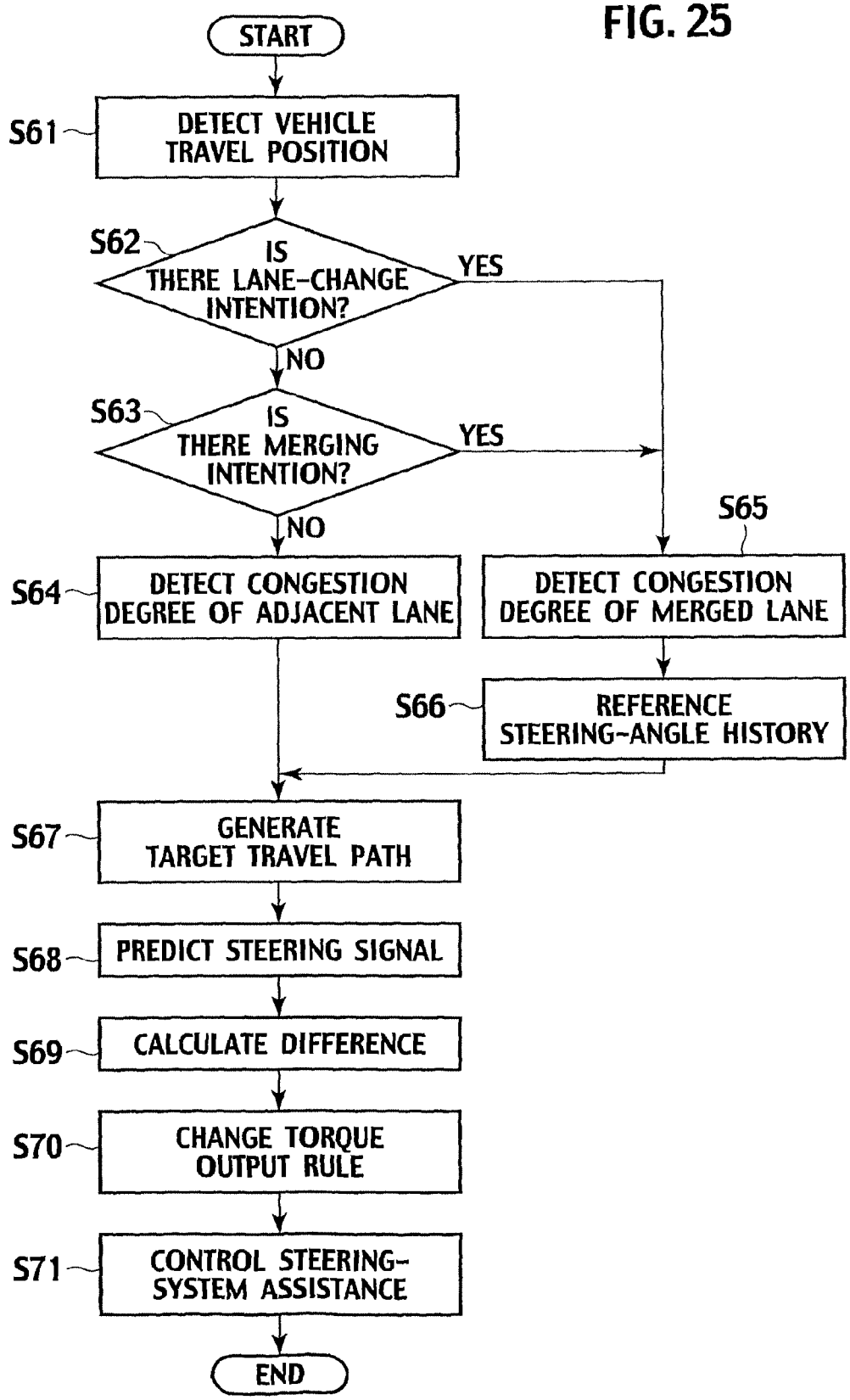
FIG. 25 is a flowchart showing the flow of the vehicle-operation assistance control process according to the fifth embodiment of the present invention.
Figure 26:
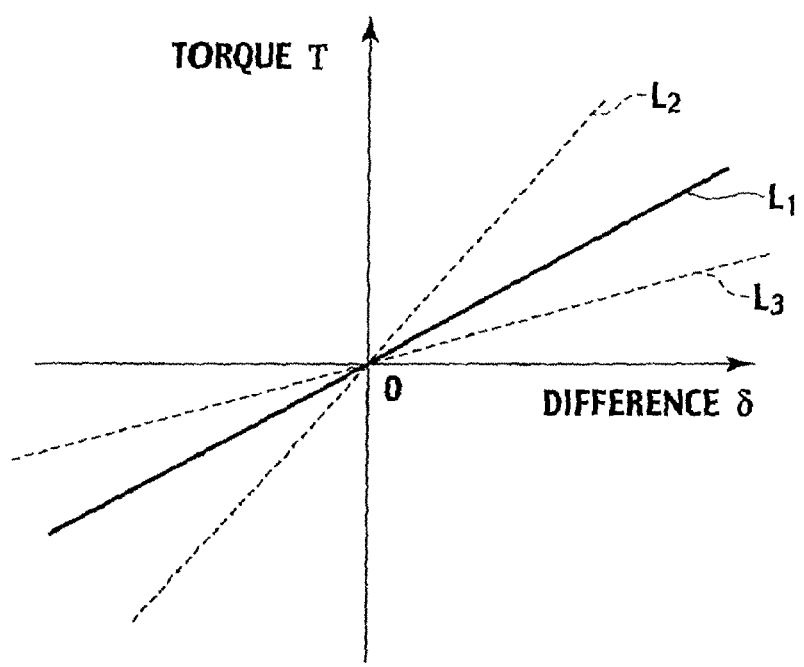
FIG. 26 is a graph showing one example of the torque output rule used for the process at step S71 shown in FIG. 25.

Last, with reference to FIG. 24 to FIG. 26, a configuration of a vehicle-operation assisting device according to the fifth embodiment of the present invention is explained.

Configuration of Vehicle-Operation Assisting Device

As shown in FIG. 24, a vehicle-operation assisting device 50 according to the fifth embodiment of the present invention includes a lane-change-intention estimating device 51, a merging-intention determining device 52, and a steering-history storage circuit 53 in addition to the vehicle-operation-state detecting device 2, the environment-state detecting device 3, the difference calculating circuit 6, and the steering-system assistance control device 8 in the vehicle-operation assisting device 10 according to the first embodiment, and the target-travel-path generating circuit 23 and the operation-signal prediction circuit 24 in the vehicle-operation assisting device 20 according to the second embodiment.

The lane-change-intention estimating device 51 corresponds to a lane-change-intention estimating means according to the present invention. The lane-change-intention estimating device 51 uses a pattern matching method known by the time of the application of the invention of the subject application to estimate an inter-vehicular distance from a preceding vehicle traveling ahead of the vehicle or a relative speed, and utilizes a technique to estimate a traffic-lane-change intention of the driver from a turning ON/OFF of a turning signal to estimate the traffic-lane-change intention of the driver.

The merging-intention determining device 52 corresponds to a merging-intention estimating means according to the present invention. The merging-intention determining device 52 includes a navigation device, and determines that the driver intends to merge when the vehicle travels on a merging traffic lane and turns on the turning signal. The steering-history storage circuit 53 corresponds to a steering-angle history storage means according to the present invention. The steering-history storage circuit 53 is configured by a non-volatile storage device such as a ROM, and stores a chronological change of the steering angle at a time of a past traffic lane change or merging.

The vehicle-operation assisting device 50 having such a configuration executes a vehicle-operation-assistance control process shown below to output vehicle-operation assistance control suitable for a state of the vehicle operation of the vehicle by the driver or an environment on a periphery of the vehicle. With reference to a flowchart shown in FIG. 24, an operation of the vehicle-operation assisting device 50 when the vehicle-operation assistance control process is executed is explained below.

Vehicle-Operation Assistance Control Process

The flowchart shown in FIG. 25 is started at a timing at which the ignition switch of the vehicle is switched from an off state to an on state, and the vehicle-operation assistance control process proceeds to a process at step S61. The vehicle-operation assistance control process is executed repeatedly for each predetermined control cycle. The process at step S61 is the same as that at step S11 shown in FIG. 4, and thus descriptions thereof will be omitted below, and the description is started from a process at step S62.

In the process at step S62, the lane-change-intention estimating device 51 determines whether the driver has the traffic-lane change intention. When a result of the determination indicates that the driver has the traffic-lane-change intention, the lane-change-intention estimating device 51 proceeds the vehicle-operation assistance control process to a process at step S65. On the other hand, when the driver does not have the traffic-lane-change intention, the lane-change-intention estimating device 51 proceeds the vehicle-operation assistance control process to a process at step S63.

In the process at step S63, the merging-intention determining device 52 determines whether the driver intends to merge onto a merged traffic lane. When a result of the determination indicates that the driver has a merging intention, the merging-intention determining device 52 proceeds the vehicle-operation assistance control process to a process at step S65. On the other hand, when the driver does not have the merging intention, the merging-intention determining device 52 proceeds the vehicle-operation assistance control process to a process at step S64.

In the process at step S64, the environment-state detecting device 3 detects a degree of congestion of a lane adjacent to the lane on which the vehicle travels. More specifically, the environment-state detecting device 3 utilizes a laser radar or an ultrasonic sensor to detect whether a vehicle is present on the lane adjacent to the lane on which the vehicle travels, and detects the number of vehicles to be detected within a predetermined time as the degree of congestion. Thereby, the process at step S64 is completed, and the vehicle-operation assistance control process proceeds to a process at step S67.

In the process at step S65, the environment-state detecting device 3 detects a degree of congestion on an entered lane onto which the vehicle is about to enter. More specifically, the environment-state detecting device 3 utilizes a laser radar or an ultrasonic sensor to detect whether a vehicle is present on the entered lane, and detects the number of vehicles to be detected within a predetermined time as the degree of congestion. Thereby, the process at step S65 is completed, and the vehicle-operation assistance control process proceeds to a process at step S66.

In the process at step S66, the target-travel-path generating circuit 23 obtains information about a chronological change of the steering angle at a time of the past lane change or merging stored in the steering-history storage circuit 53. Generally, when changing the lane or merging, the driver performs the steering operation by a fixed chronological change. Accordingly, in the fifth embodiment, the steering-history storage circuit 53 holds therein, as the steering history, the chronological change of the steering angle at a time of the past lane change or merging, and the target-travel-path generating circuit 23 obtains, as the steering history, the relevant chronological change of the steering angle, as needed. Thereby, the process at step S66 is completed, and the vehicle-operation assistance control process proceeds to a process at step S67.

In the process at step S67, the target-travel-path generating circuit 23 generates the target travel paths, i.e., a target travel path when the lane change and the merging intention are not detected; and that when at least one of the lane change and the merging intention is detected. More specifically, when the lane change and the merging intention are not detected, the target-travel-path generating circuit 23 generates, as the target travel path, a route traveled by the ideal steering angle S=G×H×υ, where T denotes a central point of the traffic lane at a position H[m] ahead of the vehicle and υ denotes an angle formed by a vector connecting the current vehicle position and the central point T and the vehicle advancing direction. On the other hand, when at least one of the lane change and the merging intention is detected, the target-travel-path generating circuit 23 generates, as the target travel path, a route traveled by the past steering history obtained by the process at step S66. Thereby, the process at step S67 is completed, and the vehicle-operation assistance control process proceeds to a process at step S68.

In the process at step S68, the operation-signal prediction circuit 24 utilizes the information detected by the vehicle-operation-state detecting device 2 to calculate a left-and-right direction position and an advancing direction angle of the vehicle within the route after an elapse of 1 second. This process is the same as that at step S16 shown in FIG. 11, and thus detailed descriptions thereof will be omitted. Thereby, the process at step S68 is completed, and the vehicle-operation assistance control process proceeds to a process at step S69.

In the process at step S69, the difference calculating circuit 6 calculates a difference between the left-and-right direction position and the advancing direction angle calculated by the process at step S46 for the ideal steering angle Ŝ generated by the process at step S67. This process is the same as that at step S17 shown in FIG. 11, and thus detailed descriptions thereof will be omitted. Thereby, the process at step S69 is completed, and the vehicle-operation assistance control process proceeds to a process at step S70.

In the process at step S70, the steering-system assistance control device 8 changes the torque output rule based on the degree of congestion detected by the processes at steps S64 and S65. The torque output rule in the fifth embodiment, as indicated by a solid line $L_1$ in FIG. 26, is an output rule in a power-assist mechanism for generating a torque in proportion to a magnitude of the difference calculated by the process at step S69, and a torque T can be expressed as T=K×δ, where K denotes a constant of proportion. The constant of proportion K becomes larger as the degree of congestion become larger, and the torque output rule is changed as indicated by a dotted line L2 in FIG. 25. On the other hand, the constant of proportion K becomes smaller as the degree of congestion becomes smaller, and the torque output rule is changed as indicated by a dotted line L3 in FIG. 25. Thereby, the process at step S70 is completed, and the vehicle-operation assistance control process proceeds to a process at step S71.

In the process at step S71, the steering-system assistance control device 8 implements control for generating the steering torque to a steering wheel. Thereby, the process at step S71 is completed, and a series of vehicle-operation assistance control processes are ended.

As is obvious from the explanations, according to the vehicle-operation assisting device 50 of the fifth embodiment of the present invention, the environment-state detecting device 3 detects the degree of congestion on the lane adjacent to the lane on which the vehicle travels and the entered lane on which the vehicle is about to enter, and the steering-system assistance control device 8 increases the control level of the steering system as the degree of congestion becomes larger. Thus, even in a situation with a high possibility of generating an unstable steering by the driver, the assistance to stabilize the steering operation can be provided to the driver.

According to the vehicle-operation assisting device 50 of the fifth embodiment of the present invention, when the lane change intention or the merging intention of the driver is estimated, the target-travel-path generating circuit 23 generates, as the target travel path, the route traveled based on the past steering history, and thus, even in a steering situation with a large deviance between the drivers, it is possible to provide vehicle operation assistance that matches the feeling of the driver.

INDUSTRIAL APPLICABILITY

The present invention can be applied to a technique of assisting an operator's control operation of a control object.

The invention claimed is:

1. A control-operation assisting method for assisting a control operation of an operator for control of a controlled object, comprising:

generating an ideal control path of the controlled object from information about a control operation state of the operator and information about a control operation environment on a periphery of the controlled object;

calculating, as an ideal control signal, a control profile of an operation system for the controlled object to operate along the generated ideal control path;

calculating a difference between the calculated ideal control signal and the information about the control operation state;

controlling the operation system based on a magnitude of the calculated difference to assist the control operation of the operator for the operation system; and estimating an accuracy required for the control operation of the controlled object, from the information about the control operation state and/or the information about the control operation environment, wherein in assisting the control operation of the operator, an assistance level of the operation system is increased as the estimated accuracy becomes higher.

2. A driving-operation assisting device that assists a vehicle operation of an operator for an operation target object, comprising:

a vehicle-operation-state detecting unit that detects information about a vehicle operation state of the operator;

an environment-state detecting unit that detects information about a vehicle operation environment on a periphery of the operation target object;

an ideal-control-path generating unit that generates an ideal control path of the operation target object from the information about the vehicle operation state detected by the vehicle-operation-state detecting unit and the information about the vehicle operation environment detected by the environment-state detecting unit;

an ideal-control-signal calculating unit that calculates, as an ideal control signal, a control history of an operation system for the operation target object to operate along the ideal control path generated by the ideal-control-path generating unit;

a difference calculating unit that calculates a difference between the ideal control signal calculated by the ideal-control-signal calculating unit and the information about the vehicle operation state detected by the vehicle-operation-state detecting unit;

an operation-system assistance controller that controls the operation system based on a magnitude of the difference calculated by the difference calculating unit to assist an operation of the operator for the operation system; and an operation-precision estimating unit that estimates an accuracy required for the vehicle operation of the operation target object, from the information about the vehicle operation state detected by the vehicle-operation-state detecting unit and/or the information about the vehicle operation environment detected by the environment-state detecting unit, wherein the operation-system assistance controller increases a control level of the operation system as the accuracy estimated by the operation-precision estimating unit becomes higher.

3. A driving-operation assisting method for assisting a vehicle operation of an operator for an operation target object, comprising:

generating an ideal control path of the operation target object from information about a vehicle operation state of the operator and information about a vehicle operation environment on a periphery of the operation target object;

calculating, as an ideal control signal, a control history of an operation system for the operation target object to operate along the generated ideal control path;

calculating a difference between the calculated ideal control signal and the information about the vehicle operation state;

controlling the operation system based on a magnitude of the calculated difference to assist an operation of the operator for the operation system; and estimating an accuracy required for the vehicle operation of the operation target object, from the information about the vehicle operation state and/or the information about the vehicle operation environment, wherein in assisting the operation of the operator, a control level of the operation system is increased as the estimated accuracy becomes higher.

4. The control-operation assisting method of claim 1, wherein the controlled object is a remotely controlled vehicle.

5. The control-operation assisting method of claim 1, wherein the controlled object is a surgery assisting device.

6. The control-operation assisting method of claim 1, wherein the controlled object is an aircraft.

* * * * *